United States Patent
Shin et al.

(10) Patent No.: US 12,229,097 B2
(45) Date of Patent: Feb. 18, 2025

(54) ELECTRONIC DEVICE AND CONTROL METHOD THEREOF

(71) Applicant: Samsung Electronics Co., Ltd., Suwon-si (KR)

(72) Inventors: Junbum Shin, Suwon-si (KR); Jihoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 17/946,599

(22) Filed: Sep. 16, 2022

(65) Prior Publication Data

US 2023/0012779 A1    Jan. 19, 2023

Related U.S. Application Data

(63) Continuation of application No. PCT/KR2021/000193, filed on Jan. 7, 2021.

(30) Foreign Application Priority Data

Mar. 17, 2020   (KR) .................. 10-2020-0032419

(51) Int. Cl.
*H04L 9/32* (2006.01)
*G06F 16/22* (2019.01)
(Continued)

(52) U.S. Cl.
CPC ...... *G06F 16/2228* (2019.01); *G06F 16/2365* (2019.01); *G06F 16/2379* (2019.01); *H04L 9/50* (2022.05)

(58) Field of Classification Search
CPC ............ G06F 16/2228; G06F 16/2365; G06F 16/2379; G06F 16/23; H04L 9/50;
(Continued)

(56) References Cited

U.S. PATENT DOCUMENTS 9,967,096 B2   5/2018   Ateniese et al.
10,084,794 B2   9/2018   Goldfarb et al.
(Continued)

FOREIGN PATENT DOCUMENTS

CN    110059054 A    7/2019
JP    2018-156464 A   10/2018
(Continued)

OTHER PUBLICATIONS

Toby Bond et al., Electrode Stack Geometry Changes during Gas Evolution in Pouch-Cell-Type Lithium Ion Batteries, Journal of The Electrochemical Society, 164 (1) A6158-A6162 (2017).
(Continued)

*Primary Examiner* — Andrew Sasinowski
(74) *Attorney, Agent, or Firm* — Jefferson IP Law, LLP

(57) ABSTRACT

An electronic device is provided. The electronic device includes a communication interface, a memory for storing at least one instruction and storing a plurality of pieces of transaction information and a plurality of index values corresponding to the plurality of pieces of transaction information, and at least one processor configured to control the electronic device by being connected to the memory, wherein the at least one processor is further configured to execute the at least one instruction to, when a delete request including an index value corresponding to transaction information is received, compare the index value included in the delete request with the plurality of index values stored in the memory, delete transaction information corresponding to the index value included in the delete request from the memory, based on a result of the comparison, generate verification data corresponding to the interface to transmit the generated verification data to an external server included in a blockchain network.

15 Claims, 21 Drawing Sheets

(51) Int. Cl.
*G06F 16/23* (2019.01)
*H04L 9/00* (2022.01)

(58) Field of Classification Search
CPC . H04L 2209/56; H04L 63/12; H04L 67/1097; G06Q 20/38; G06Q 20/40; G06Q 20/382; G06Q 20/401
See application file for complete search history.

(56) References Cited

U.S. PATENT DOCUMENTS

| | | | |
|---|---|---|---|
| 10,121,019 | B2 | 11/2018 | Struttmann |
| 10,417,219 | B1 | 9/2019 | Yang et al. |
| 10,797,871 | B1* | 10/2020 | McCormack ......... H04L 9/0643 |
| 2019/0146946 | A1 | 5/2019 | Zhang |
| 2020/0218940 | A1* | 7/2020 | Anglin ................. H04L 9/0637 |
| 2021/0073287 | A1* | 3/2021 | Hunter ................. H04L 63/123 |
| 2021/0266167 | A1* | 8/2021 | Lohe ...................... G06Q 20/10 |

FOREIGN PATENT DOCUMENTS

| | | |
|---|---|---|
| JP | 2020-013175 A | 1/2020 |
| KR | 10-1893729 B1 | 10/2018 |
| KR | 10-2019-0089506 A | 7/2019 |
| KR | 10-2020-0019061 A | 2/2020 |
| KR | 10-2020-0020291 A | 2/2020 |
| KR | 10-2085140 B1 | 3/2020 |
| KR | 10-2088346 B1 | 3/2020 |
| KR | 10-2094497 B1 | 4/2020 |
| KR | 10-2331947 B1 | 11/2021 |
| WO | 2017/203093 A1 | 11/2017 |

OTHER PUBLICATIONS

Mathis Steichen et al., Blockchain-Based, Decentralized Access Control for IPFS (Aug. 3, 2018).
Korean Office Action dated Jan. 2, 2025, issued in Korean Application No. 10-2020-0032419.

* cited by examiner

ELECTRONIC DEVICE AND CONTROL METHOD THEREOF

CROSS-REFERENCE TO RELATED APPLICATION(S)

This application is a continuation application, claiming priority under § 365(c), of an International application No. PCT/KR2021/000193, filed on Jan. 7, 2021, which is based on and claims the benefit of a Korean patent application number 10-2020-0032419, filed on Mar. 17, 2020, in the Korean Intellectual Property Office, the disclosure of which is incorporated by reference herein in its entirety.

BACKGROUND

1. Field

The disclosure relates to an electronic device and a control method. More particularly, the disclosure relates to an electronic device that distributes and stores data in an off-chain network and a control method thereof.

2. Description of Related Art

There is a method of directly storing transaction information in blockchain data and a method of storing transaction information in a separate storage without directly storing the transaction information in blockchain data.

The method of directly storing transaction information in blockchain data has the advantage that transaction information is transparently disclosed to a large number of users who form a blockchain network because the transaction information is included in the block. However, due to the disadvantage that their personal information is disclosed to everyone, some users may use a method of storing transaction information in a separate storage.

However, some users may not want their transaction information to be stored in a separate storage. In this case, some users may request deletion of their transaction information.

However, even when users request to delete their transaction information, there is a problem in that the users may not actually confirm the delete completion of their transaction information. In addition, there may be a problem in terms of information transparency in that information on the delete request and the delete completion is not disclosed to other users.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device capable of generating verification data corresponding to a deletion operation of transaction information when a deletion of the transaction information stored in an off-chain network is requested, and a control method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a communication interface, a memory configured to store at least one instruction and store a plurality of pieces of transaction information and a plurality of index values corresponding to the plurality of pieces of transaction information, and at least one processor configured to be connected to the memory to control the electronic device, in which the at least one processor is further configured to execute the at least one instruction to compare an index value included in a delete request with the plurality of index values stored in the memory when the delete request including the index value corresponding to the transaction information is received, delete the transaction information corresponding to the index value included in the delete request from the memory based on a comparison result, generate verification data corresponding to the deletion of the transaction information, and control the communication interface to transmit the generated verification data to an external server included in a blockchain network.

The verification data may include information indicating whether a delete operation is performed on the transaction information corresponding to the index value included in the delete request in the memory.

The verification data may include at least one of contents of the delete request, the index value included in the delete request, identification information of the electronic device that generates the verification data, delete result information, and time information at which the delete operation is performed.

The at least one processor may request an environment verification server to validate a hardware environment of the electronic device or a software environment of the electronic device for generating the verification data, and control the communication interface to transmit verification data to the external server when verification data is received from the environment verification server.

The at least one processor may request deletion authority information from the external server when the delete request is received, and delete transaction information corresponding to the received delete request when the deletion authority information is received from the external server.

The deletion authority information may be obtained based on a smart contract stored in the external server, and the smart contract may include at least one of storage authority information of the electronic device and deletion authority information of the electronic device.

The verification data may be proof of execution (POE) data corresponding to the deletion of the transaction information.

In accordance with another aspect of the disclosure, a server is provided. The server includes a communication interface, a memory configured to store block data including an index value corresponding to transaction information and blockchain data including the block data, and at least one processor connected to the memory to control the server, in which the at least one processor generates, when the delete request of transaction information is received, block data including information on the received delete request and adds the generated block data to the blockchain data, identifies an index value included in the delete request, and controls the communication interface to transmit a delete request for transaction information corresponding to the identified index value to an external electronic device.

The at least one processor may obtain result information of the delete request based on verification data when verification data corresponding to the delete request is received from an external electronic device, generate block data including result information of the delete request, and add block data including result information of the generated delete request to the blockchain data.

When verification data is received from a plurality of external electronic devices, respectively, the at least one processor may compare the plurality pieces of received verification data and obtain result information of the delete request based on a comparison result.

The at least one processor may identify verification data including information different from the result information of the delete request among the plurality of received verification data, and determine that the identified verification data is forged.

The at least one processor may identify an external electronic device that transmits the forged verification data, and change storage authority information of the identified external electronic device.

The memory may store smart contract information, and the smart contract may include at least one of storage authority information of the external electronic device and deletion authority information of the external electronic device.

The at least one processor may obtain identification information of a user terminal device that transmits the delete request, and determine whether the user terminal device has authority to delete transaction information corresponding to the index value included in the delete request based on the obtained identification information of the user terminal device.

The verification data may include information indicating whether a delete operation is performed on the transaction information corresponding to the index value included in the delete request in the external electronic device.

The verification data may include at least one of contents of the delete request, the index value included in the delete request, identification information of the electronic device that generates the verification data, delete result information, and time information at which the delete operation is performed.

In accordance with another aspect of the disclosure, a method of controlling an electronic device for storing a plurality of pieces of transaction information and a plurality of index values corresponding to the plurality of pieces of transaction information is provided. The control method includes comparing an index value included in a delete request with the plurality of index values stored in a memory when the delete request including the index value corresponding to the transaction information is received, deleting the transaction information corresponding to the index value included in the delete request from the memory based on a comparison result, generating verification data corresponding to the deletion of the transaction information, and transmitting the generated verification data to an external server included in a blockchain network.

The verification data may include information indicating whether a delete operation is performed on the transaction information corresponding to the index value included in the delete request in the memory.

The verification data may include at least one of contents of the delete request, the index value included in the delete request, identification information of the electronic device that generates the verification data, delete result information, and time information at which the delete operation is performed.

The method may further include requesting an environment verification server to validate a hardware environment of the electronic device or a software environment of the electronic device for generating the verification data, and transmitting verification data to the external server when verification data is received from the environment verification server.

The method may further include requesting deletion authority information from the external server when the delete request is received, and deleting transaction information corresponding to the received delete request when the deletion authority information is received from the external server.

The deletion authority information may be obtained based on a smart contract stored in the external server, and the smart contract may include at least one of storage authority information of the electronic device and deletion authority information of the electronic device.

The verification data may be proof of execution (POE) data corresponding to the deletion of the transaction information.

In accordance with another aspect of the disclosure, a method of controlling a server storing block data including an index value corresponding to transaction information and blockchain data including the block data is provided. The method includes generating, when a delete request of transaction information is received, block data including information on the received delete request, adding the generated block data to the blockchain data, identifying an index value included in the delete request, and transmitting a delete request for transaction information corresponding to the identified index value to an external electronic device.

The method may further include obtaining result information of the delete request based on verification data when verification data corresponding to the delete request is received from an external electronic device, generating block data including result information of the delete request, and adding the block data including result information of the generated delete request to the blockchain data.

In the obtaining of the result information of the delete request, when verification data is received from a plurality of external electronic devices, respectively, the at least one processor may compare the plurality pieces of received verification data and obtain result information of the delete request based on a comparison result.

The method may further include identifying verification data including information different from the result information of the delete request among the plurality of received verification data, and determining whether the identified verification data is forged.

The method may further include identifying an external electronic device that transmits the forged verification data, and changing storage authority information of the identified external electronic device.

The server may store smart contract information, and the smart contract may include at least one of storage authority information of the external electronic device and deletion authority information of the external electronic device.

The method further includes obtaining identification information of a user terminal device that transmits the delete request, and determining whether the user terminal device has authority to delete transaction information corresponding to the index value included in the delete request based on the obtained identification information of the user terminal device.

The verification data includes information indicating whether a delete operation is performed on the transaction information corresponding to the index value included in the delete request in the external electronic device.

The verification data includes at least one of contents of the delete request, the index value included in the delete request, identification information of the electronic device that generates the verification data, delete result information, and time information at which the delete operation is performed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
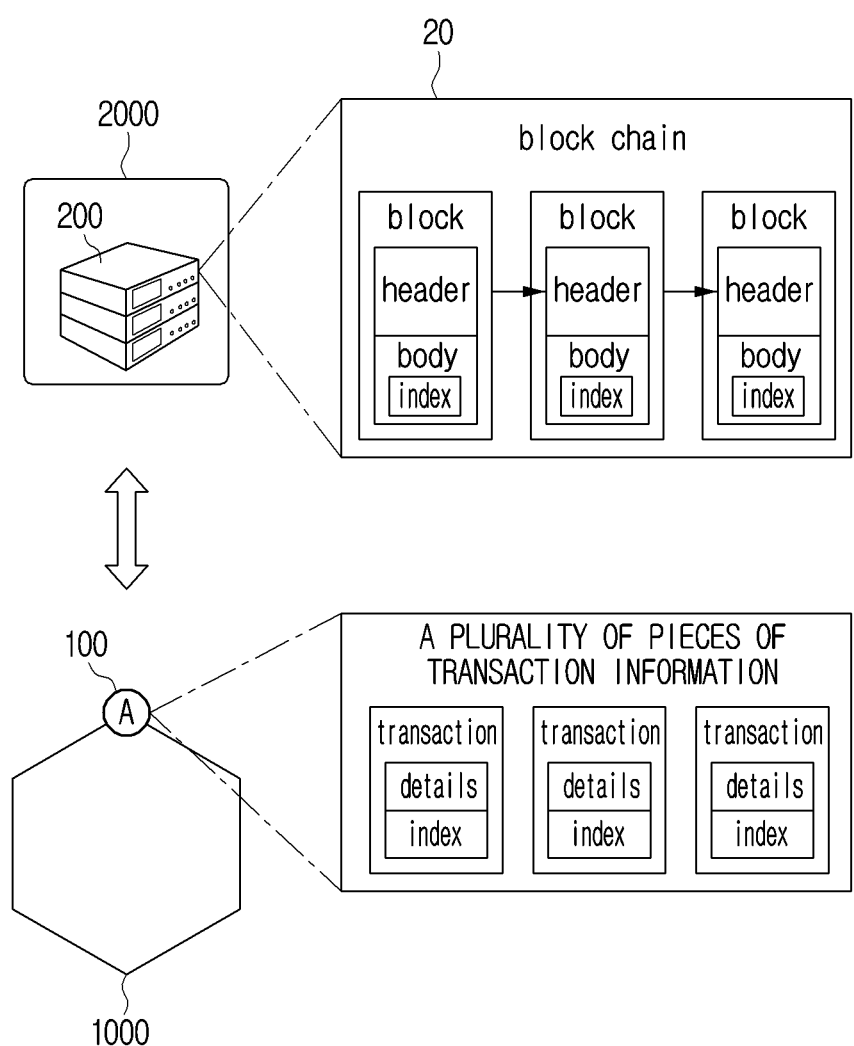
FIG. 1A is a diagram illustrating a blockchain network and an off-chain network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

General terms that are currently widely used were selected as terms used in embodiments of the disclosure based on functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in a corresponding description portion of the disclosure. Therefore, the terms used in the disclosure should be defined based on the meaning of the terms and the contents throughout the disclosure rather than simple names of the terms.

In the disclosure, an expression "have", "may have", "include", "may include", or the like, indicates existence of a corresponding feature (for example, a numerical value, a function, an operation, a component, such as a part, or the like), and does not exclude existence of an additional feature.

An expression "at least one of A and/or B" is to be understood to represent "A" or "B" or "any one of A and B."

Expressions "first", "second", '1st" or "2nd" or the like, used in the disclosure may indicate various components regardless of a sequence and/or importance of the components, will be used only in order to distinguish one component from the other components, and do not limit the corresponding components.

When it is mentioned that any component (for example, a first component) is (operatively or communicatively} coupled with/to or is connected to another component (for example, a second component), it is to be understood that any component is directly coupled to another component or may be coupled to another component through the other component (for example, a third component).

It will be further understood that terms "include" or "formed of" used in the specification specify the presence of features, numerals, operations, components, parts, or combinations thereof mentioned in the specification, but do not preclude the presence or addition of one or more other features, numerals, operations, components, parts, or combinations thereof.

In the disclosure, a "module" or a "~er/or" may perform at least one function or operation, and be implemented by hardware or software or be implemented by a combination of hardware and software. In addition, a plurality of "modules" or a plurality of "~ers/~ors" may be integrated in at least one module and be implemented by at least one processor (not illustrated) except for a "module" or a "~er/or" that needs to be implemented by specific hardware.

In the disclosure, the term "user" may refer to a person using the electronic device 1 or a device (for example, an artificial intelligence electronic device) using the electronic device 1.

FIG. 1A is a diagram illustrating a blockchain network and an off-chain network according to an embodiment of the disclosure.

Referring to FIG. 1A, a data storage system may refer to a system for storing transaction information. In addition, an off-chain network 1000 may be a space for storing transaction information, and a blockchain network 2000 may refer to a blockchain system that stores a hash value related to specific data.

The off-chain network 1000 may be a system for storing transaction information. Specifically, the off-chain network 1000 may be configured as a network separate from the blockchain network 2000, and may store transaction details of transaction information not stored in the blockchain network 2000. The off-chain network 1000 may store transaction information, and the transaction information stored in the off-chain network 1000 may include transaction details and index values corresponding to the transaction details. In addition, the off-chain network 1000 may include an electronic device 100.

The off-chain may refer to a system that stores transaction information in a separate storage without storing the transaction information in a main blockchain. The off-chain technology may reduce processing speed and increase throughput compared to an on-chain technology. Here, the on-chain technology may refer to a system that stores transaction information in the main blockchain, and may be a concept opposite to off-chain.

The off-chain network 1000 may refer to a network constituting an off-chain. Referring to FIG. 1A, an electronic device 100 may be a device constituting the off-chain network 1000.

Here, the off-chain network 1000 may refer to a network that stores data predefined by a user, separately from the blockchain network 2000. Here, the data predefined by the user may mean transaction information. The transaction information may include transaction details for a transaction operation and index information corresponding to the transaction details. The transaction details may refer to text information related to a transaction operation. The off-chain network 1000 may not participate in block generation separately from the blockchain network 2000, and may store and delete transaction information. As a result, the transaction details may be stored only in the off-chain network 1000, and the transaction details may not be stored in the blockchain network 2000.

The blockchain network 2000 may mean a main blockchain. The blockchain network 2000 according to the embodiment of the disclosure may be a system constituting a blockchain that does not include transaction information. The blockchain network 2000 may include a server 200. The blockchain network 2000 may include blockchain data 20, and the blockchain data 20 may include a plurality of blocks. The plurality of blocks may include a header and a body. The body may include an index related to the transaction information, and a detailed description related to the block will be described later with reference to FIGS. 2A and 2B.

Here, the blockchain data may refer to data for a block including a hash value corresponding to a user command in a data group in which a plurality of blocks are connected by a hash value. The blockchain data (data about a block including a hash value corresponding to a user command) may be shared and stored by a plurality of servers. The blockchain network 2000 may newly generate a block (block including a hash value corresponding to a user command) by a preset method and combines the generated block with the existing block (the entire blockchain data in which a plurality of blocks are connected except for the newly generated block). For example, the blockchain network 2000 may generate a new block every preset time. As another example, the blockchain network 2000 may generate a new block when transaction data is stored over a certain size. As another example, the blockchain network 2000 may generate a new block whenever transaction data is received. The block according to the embodiment of the disclosure may be generated by an off-chain method, and a specific method thereof will be described later with reference to FIG. 2B.

Meanwhile, in FIG. 1A, an embodiment in which the off-chain network 1000 and the blockchain network 2000 are configured as one device has been described. However, according to the implementation example, the off-chain network 1000 and the blockchain network 2000 may be configured as a plurality of devices. A detailed description thereof will be described later with reference to FIG. 1B.

Figure 1B:
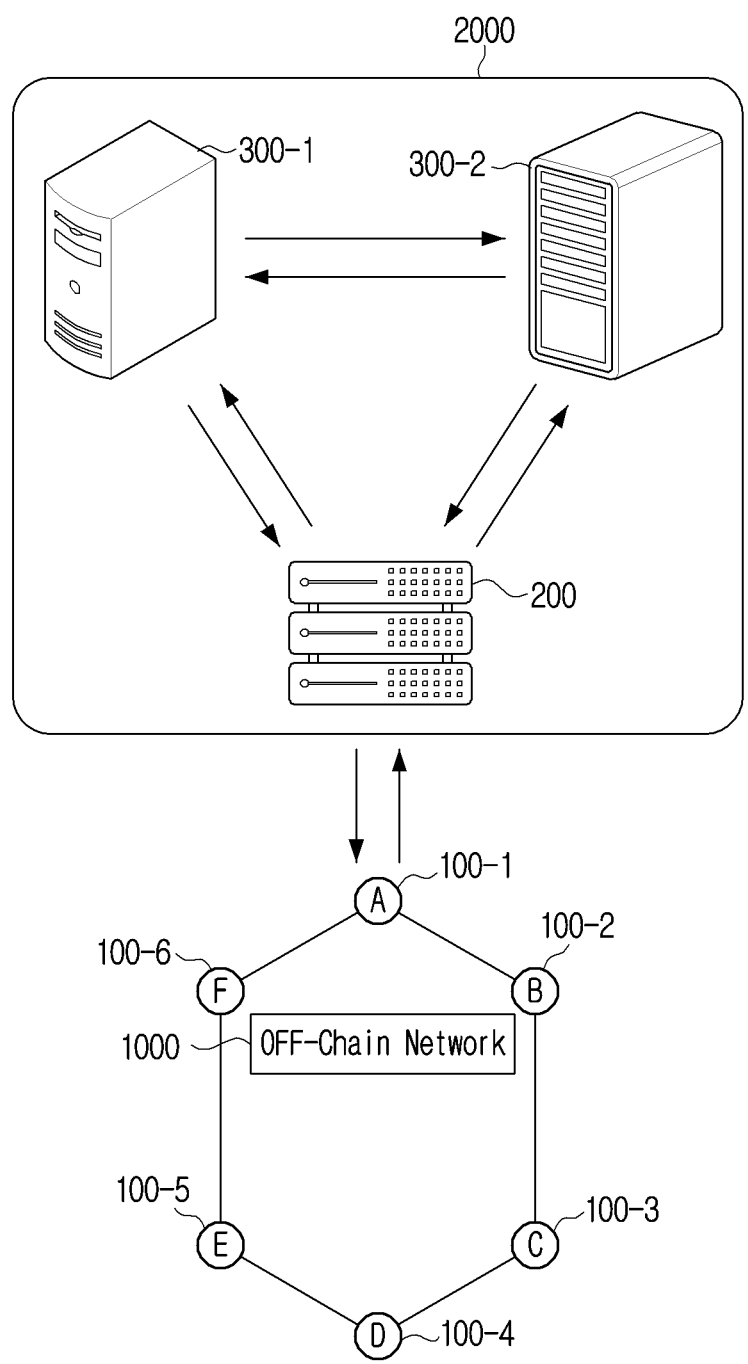
FIG. 1B is a diagram illustrating a blockchain network and an off-chain network according to an embodiment of the disclosure.

FIG. 1B is a diagram illustrating a blockchain network and an off-chain network according to an embodiment of the disclosure.

Referring to FIG. 1B, the data storage system may include an off-chain network 1000 and a blockchain network 2000, and the off-chain network 1000 may include a plurality of nodes. Here, the plurality of nodes may mean a plurality of servers or a plurality of electronic devices connected to the off-chain network 1000. The plurality of nodes 100-1, 100-2, 100-3, 100-4, 100-5, and 100-6 may refer to electronic devices for storing transaction information. The transaction information stored in the plurality of nodes 100-1, 100-2, 100-3, 100-4, 100-5, and 100-6 may correspond to a block related to transaction information.

The blockchain network 2000 may refer to a network sharing blockchain data, and the blockchain network 2000 may include a plurality of servers. The blockchain network 2000 may include a first server 300-1, a second server 300-2, and a management server 200. Here, the management server 200 may be the server 200 of FIG. 1A. In the disclosure, the server 200 may be described as the management server 200 in order to distinguish a plurality of servers.

The first server 300-1 may refer to a server that directly receives a user command. For example, when a user inputs a command using a smartphone application, the first server 300-1 may be an application server that receives the input command.

The second server 300-2 may be a server related to a target device to be controlled through the user command. For example, when a user inputs a command to turn on a power supply of an air conditioner using a smartphone application, the second server 300-2 may be a server that controls the air conditioner.

The management server 200 may be a server that transmits a process of transmitting a user's command to the off-chain network 1000. For example, when the user inputs a command to turn on the power supply of the air conditioner using the smartphone application, the management server 200 may transmit the transaction information corresponding to the user's command to the off-chain network 1000.

At least one of the first server 300-1, the second server 300-2, and the management server 200 included in the blockchain network 2000 may generate transaction information related to a user command and generate a block using a hash value corresponding to the transaction information. The generated block may be shared with all of the first server 300-1, the second server 300-2, and the management server 200, and each server may store the generated block. In addition, the management server 200 may transmit the transaction information corresponding to the user command to the off-chain network 1000.

Meanwhile, the blockchain network 2000 has been described as being including three servers, by may be implemented in a form including three or more servers according to an actual implementation example. In addition, on the contrary, the blockchain network 2000 may be implemented in a form including two servers. An embodiment in which the blockchain network 2000 is configured with one server has been described with reference to FIG. 1A.

Meanwhile, although the management server 200 has been described as transmitting transaction information to the off-chain network 1000, according to an actual implementation example, the first server 300-1, the second server 300-2, or any other server may be implemented in the form of transmitting transaction information.

Meanwhile, the off-chain network 1000 and the blockchain network 2000 may include a plurality of nodes or a plurality of servers, respectively. In this specification, for convenience of technology, the off-chain network 1000 is described as including a plurality of nodes, and the blockchain network 2000 is described as including a plurality of servers.

Figure 2A:
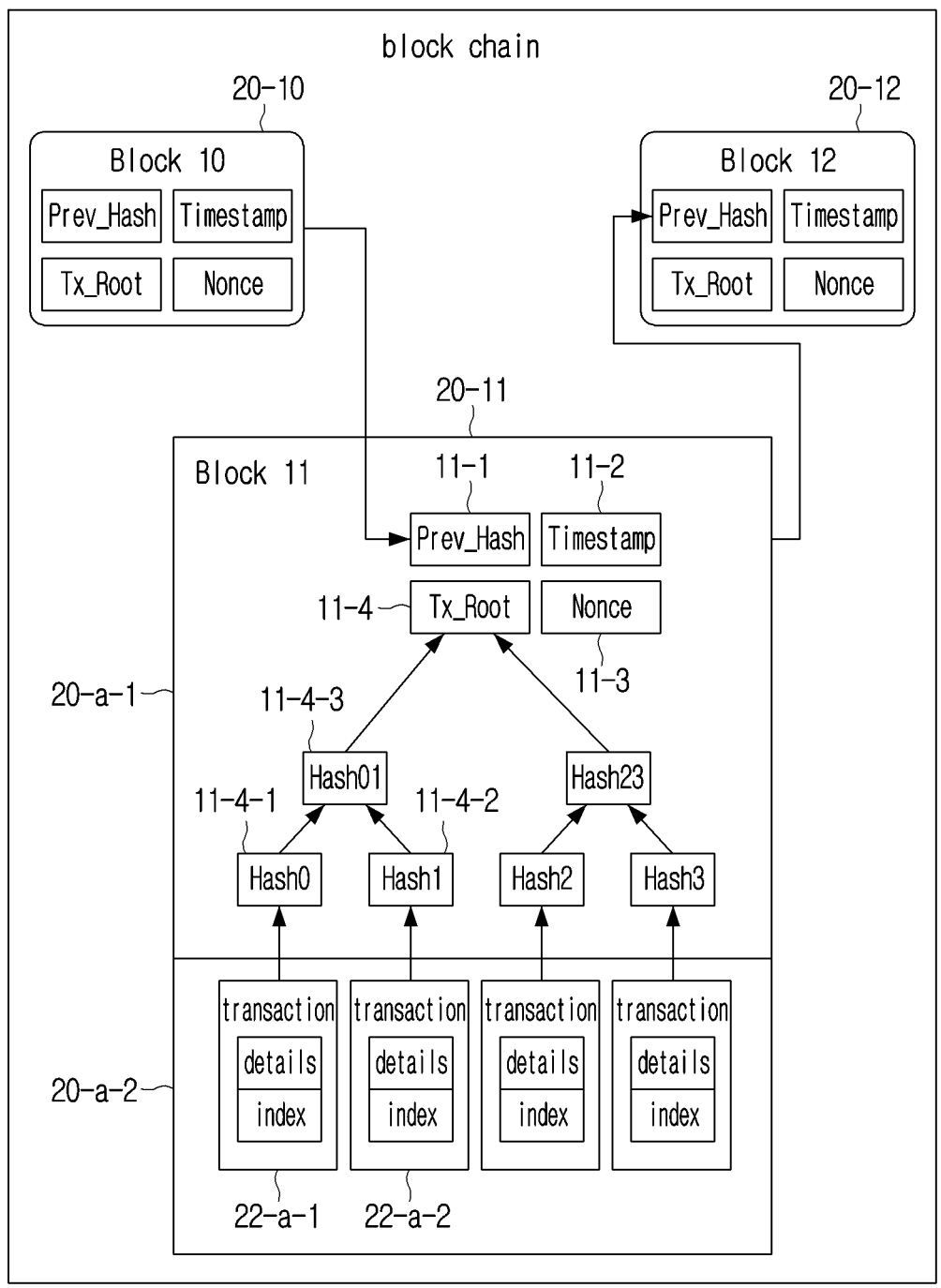
FIG. 2A is a diagram illustrating blockchain data stored in an electronic device according to an embodiment of the disclosure.

FIG. 2A is a diagram illustrating blockchain data stored in an electronic device according to an embodiment of the disclosure.

Referring to FIG. 2A, the blockchain data 20 may include a plurality of blocks 20-10, 20-11, and 20-12.

According to an embodiment of the disclosure, all blocks may be stored in an on-chain method. For example, when a user's command is received, the on-chain method in which detailed transaction information on which command a user gives to anyone in a block is included in a block may be used for block generation.

According to another embodiment of the disclosure, all blocks may be generated in an off-chain method. For example, when a user's command is received, the off-chain method in which detailed transaction information on which command a user gives to anyone is not included in a block, but is stored in a separate external server or an external network may be used for block generation.

According to another embodiment of the disclosure, some blocks may be stored in an on-chain method and some other blocks may be stored in an off-chain method. For example, when a first user command is received, transaction information corresponding to the first user command may be included in the block, and when a second user command is received, transaction information corresponding to the second user command may not be included in the block. A criterion for classifying the first user command and the second user command may be predefined. For example, a general user command may use an off-chain method, and information related to a delete command and a delete completion may use the on-chain method.

FIG. 2A may be a diagram illustrating a block generated in an on-chain method among the above-described embodiments.

According to the on-chain method, blockchain data may include a plurality of blocks 20-10, 20-11, and 20-12. One block 20-11 of the plurality of blocks 20-10, 20-11, and 20-12 may be divided into a header **20-*a*-1 and a body 20-*a*-2. The header 20-*a*-1 may store hash value information 11-1, time information 11-2, random number information 11-3, and target information 11-4 of the previous block. The body 20-*a*-2 may include a plurality of pieces of transaction information 22-*a*-1 and 22-*a*-2. In addition, each of the plurality of pieces of transaction information 22-*a*-1 and 22-*a*-2 may include transaction details related to the transaction information and index values corresponding to the transaction details. On the other hand, in the case of the off-chain method, the transaction details may not be included in the body 20-*a*-2** of the block. The off-chain method will be described later with reference to FIG. 2B.

One block 20-11 of the plurality of blocks may refer to a data unit including hash value information 11-1, time information 11-2, random number information 11-3, and target information 11-4 of the previous block.

The hash value information 11-1 of the previous block may refer to information in which information on the previous block is converted into a hash value by a hash function. The hash function may refer to a function that converts input data into data of a specific size (e.g., 256 bits). The input data by the hash function may be output with a fixed size (or a fixed length), and when the input data is the same, the output data by the hash function may also be the same. In addition, even if some of the input data is changed, the output data by the hash function may be completely different data. Therefore, it may be difficult to infer the input value only from the output data. Here, the hash function may refer to a function based on a Secure Hash Algorithm (SHA). Meanwhile, since the plurality of blocks include hash value information of the previous block, the plurality of blocks may be interconnected based on the generation order.

The time information 11-2 may be time information related to the generation of the block. For example, the time information 11-2 may refer to at least one of a time at which data is stored in a block, a time at which the block is generated, and a time at which the block is finally determined. When the above-described example is only temporary, the time information 11-2 may include various types of time information related to a block.

The random number information 11-3 may refer to an arbitrary number required to obtain a hash value in the process of generating a block.

The target information 11-4 may refer to information related to a target stored in a block. For example, when a specific transaction history is to be stored in a block, the target information 11-4 may be information related to the transaction history. Here, the target information 11-4 may refer to a final hash value or a Merkle root related to transaction details.

When the hash function receives the plurality of pieces of transaction information 22-a-1 and 22-a-2 as input data, hash values 11-4-1 and 11-4-2 of first levels may be generated as output data. When the hash function receives the hash values 11-4-1 and 11-4-2 of the first level as the input data, a hash value 11-4-3 of a second level may be generated as output data according to the predefined calculation process. Here, the hash function may obtain the final hash value (or Merkle root, or Merkle hash) 11-4 of the Merkle tree by combining the hash value (11-4-3) and another hash value (hash23). The Merkle tree may refer to a data structure for obtaining the final hash value (or the Merkle root) in a method of changing a transaction history to a hash value and changing two hash values to one hash value. The Merkle tree may be described as target information in this specification.

Meanwhile, although the hash value of the first level or the hash value of the second level has been described in FIG. 2A, hash values of more levels may be obtained based on the number or size of transaction information.

Meanwhile, the blockchain data disclosed in FIG. 2A shows a configuration according to an embodiment of the disclosure, and various blockchain data having a different configuration may be applied according to an implementation embodiment.

Figure 2B:
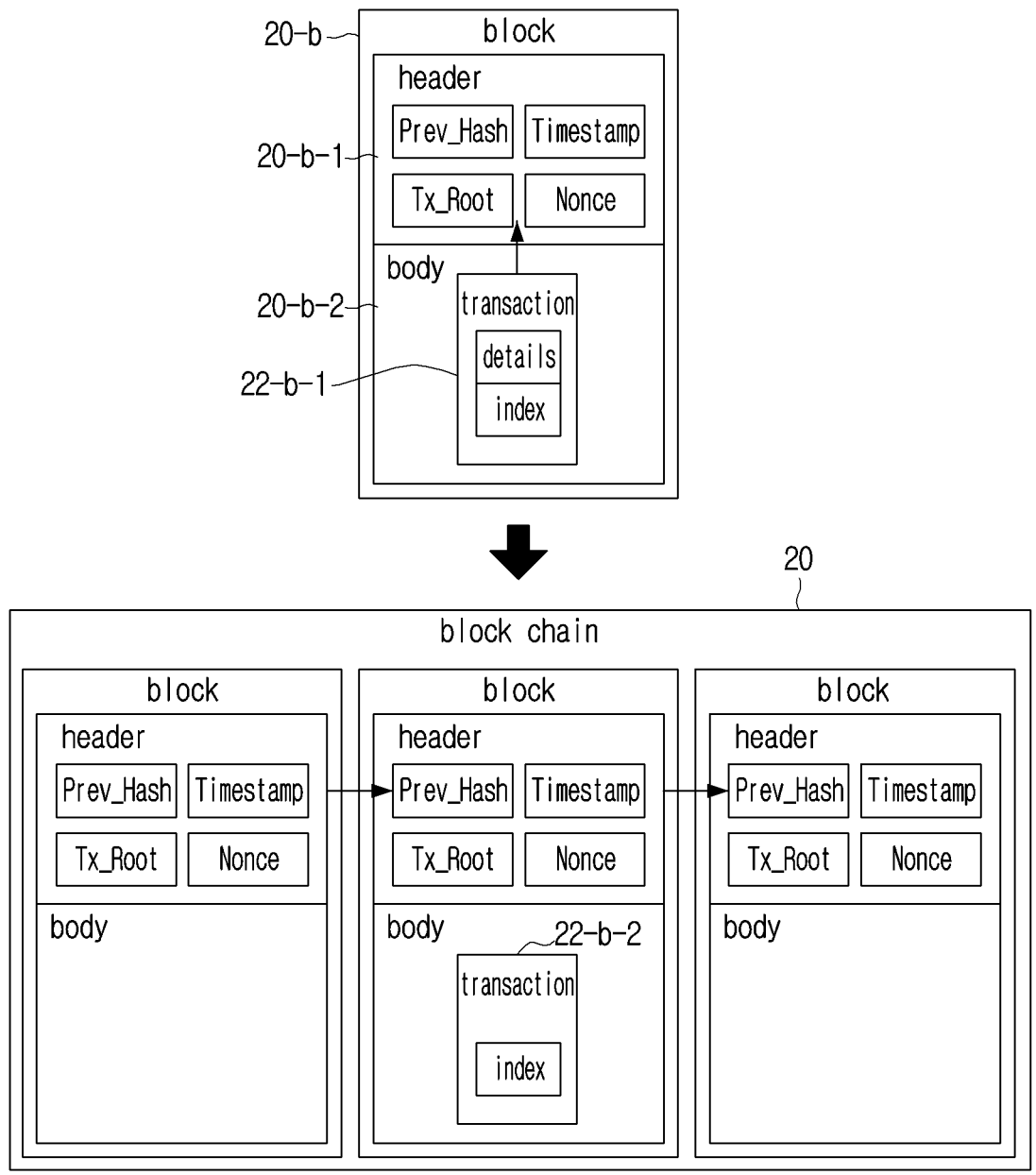
FIG. 2B is a diagram illustrating blockchain data stored in an electronic device according to an embodiment of the disclosure.

FIG. 2B is a diagram illustrating blockchain data stored in an electronic device according to an embodiment of the disclosure.

Referring to FIG. 2B, the blockchain data 20 may be configured in the off-chain method. The off-chain method may refer to a method in which the transaction details related to the transaction information are not stored in the block but are stored in a separate storage. Here, transaction details related to transaction information may refer to text data of a specific transaction. For example, transaction details may be text information "User A transmits control command C to user B." The off-chain method may mean that the text data itself, which is the transaction details, is not stored in the block, but the transaction details themselves are stored in a separate storage.

Here, the final hash value constituting the header 20-b-1 of the block may be obtained based on the transaction information 22-b-1. Here, the transaction information 22-b-1 may include transaction details related to the transaction information and index values corresponding to the transaction details. The transaction information may be stored in a body 20-b-2 of a block 20-b.

However, in the off-chain method, finally, the body 20-b-2 of the block 20-b may not store transaction details among transaction information. The off-chain method may transmit transaction details, which is a key part of transaction information, to an off-chain network, which is a separate storage, without storing the transaction details in the body 20-b-2 of the block. Accordingly, the body 20-b-2 of the block may store transaction information 22-b-2 including only index values corresponding to transaction details.

As a result, the blockchain according to the off-chain method may be configured as shown in the blockchain data 20 of FIG. 2B.

Figure 3A:
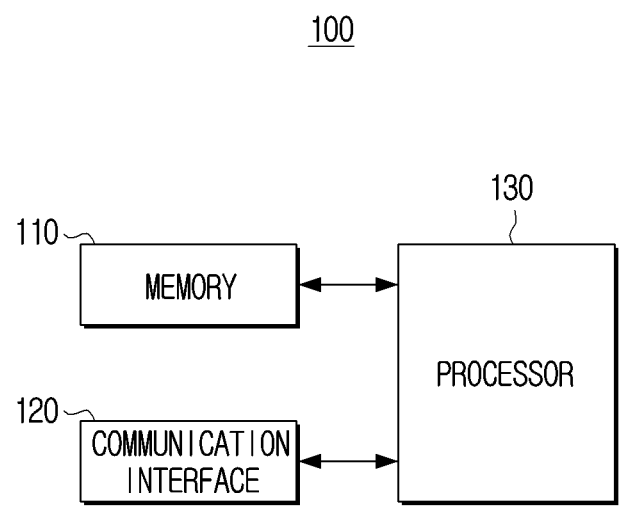
FIG. 3A is a block diagram illustrating an electronic device according to an embodiment of the disclosure.

FIG. 3A is a block diagram illustrating an electronic device according to an embodiment of the disclosure.

Referring to FIG. 3A, the electronic device 100 may include a memory 110, a communication interface 120, and a processor 130.

The electronic device 100 according to various embodiments of the specification may be an electronic device that stores data. For example, the electronic device 100 may be at least one of a smartphone, a tablet personal computer (PC), a desktop PC, a laptop PC, a netbook computer, a workstation, a server, and a PDA.

The memory 110 may be implemented by an internal memory, such as a read-only memory (ROM) (for example, an electrically erasable programmable read-only memory (EEPROM)), a random access memory (RAM), or the like, included in the processor 130 or be implemented by a memory separate from the processor 130. In this case, the memory 110 may be implemented in a form of a memory embedded in the electronic device 100 or a form of a memory attachable to and detachable from the electronic device 100, depending on a data storing purpose. For example, data for driving the electronic device 100 may be stored in the memory embedded in the electronic device 100, and data for an extension function of the electronic device 100 may be stored in the memory attachable to and detachable from the electronic device 100.

The memory 110 may store at least one of a block or transaction information corresponding to a user command.

Meanwhile, the memory embedded in the electronic device 100 may be implemented by at least one of a volatile memory (for example, a dynamic RAM (DRAM), a static RAM (SRAM), a synchronous dynamic RAM (SDRAM), or the like) or a non-volatile memory (for example, a one time programmable ROM (OTPROM), a programmable ROM (PROM), an erasable and programmable ROM (EPROM), an electrically erasable and programmable ROM (EEPROM), a mask ROM, a flash ROM, a flash memory (for example, a NAND flash, a NOR flash, or the like), a hard drive, or a solid state drive (SSD)), and the memory attachable to and detachable from the electronic device 100 may be implemented in a form, such as a memory card (for example, a compact flash (CF), a secure digital (SD), a micro-SD, a mini-SD, an extreme digital (xD), a multimedia card (MMC), or the like), an external memory (for example, a universal serial bus (USB) memory) connectable to a USB port, or the like.

The memory 110 may store at least one instruction. The processor 130 may perform various operations based on an instruction stored in the memory 110.

The memory 110 may store a plurality of pieces of transaction information and a plurality of index values corresponding to a plurality of pieces of transaction information.

The transaction information may refer to transaction details related to a transaction operation and index information corresponding to the transaction details.

For example, it is assumed that the transaction operation is "User A remits $10 to User B." The transaction details may be text information on "User A remits $10 to User B," and the index values corresponding to the transaction details may be "#001." The off-chain network 1000 may store transaction details (text information on "User A remits 10$ to User B") and an index value "#001" corresponding to the transaction details.

On the other hand, the blockchain network 2000 may not store transaction details (text information on "User A remits 10$ to User B") and store an index value "#001" corresponding to the transaction details. As an example, the blockchain network 2000 may store an index value "#001" corresponding to transaction details by including the index value "#001" in a block. As another example, the blockchain network 2000 may store an index value "#001" corresponding to the transaction details by including the index value "#001" in a smart contract. As another example, the blockchain network 2000 may store the index value "#001" corresponding to the transaction details in the memory of at least one server included in the blockchain network 2000.

The communication interface 120 is a component performing communication with various types of external apparatuses depending on various types of communication manners. The communication interface 120 includes a wireless fidelity (Wi-Fi) module, a Bluetooth module, an infrared communication module, a wireless communication module, and the like. Here, each communication module may be implemented in the form of at least one hardware chip.

The Wi-Fi module and the Bluetooth module perform communication in a Wi-Fi manner and a Bluetooth manner, respectively. In the case of using the Wi-Fi module or the Bluetooth module, various connection information, such as a service set identifier (SSID), a session key, and the like, is first transmitted and received, communication is connected using the connection information, and various information may then be transmitted and received.

The infrared communication module performs communication according to an infrared data association (IrDA) technology of wirelessly transmitting data to a short distance using an infrared ray positioned between a visible ray and a millimeter wave.

The wireless communication module may include at least one communication chip performing communication according to various wireless communication standards, such as zigbee, $3^{rd}$ generation (3G), $3^{rd}$ generation partnership project (3GPP), long term evolution (LTE), LTE advanced (LTE-A), 4th generation (4G), 5th generation (5G), and the like, in addition to the communication manner described above.

In addition, the communication interface 120 may include a local area network (LAN) module, an Ethernet module, and at least one of wired communication modules performing communication using a pair cable, a coaxial cable, an optical fiber cable, or the like.

According to an example, the communication interface 120 may use the same communication module (for example, the Wi-Fi module) to communicate with an external device, such as a remote control and an external server.

According to an example, the communication interface 120 may use different communication modules (for example, Wi-Fi modules) to communicate with an external device, such as a remote control and an external server. For example, the communication interface 120 may use at least one of the Ethernet module or the Wi-Fi module to communicate with the external server, and may use a BT module to communicate with the external device, such as the remote control. However, this is only an example, and the communication interface 120 may use at least one of various communication modules in a case in which it communicates with a plurality of external devices or external servers.

The processor 130 may control the overall control operation of the electronic device 100. Specifically, the processor 130 may control the overall operation of the electronic device 100.

The processor 130 may be implemented by a digital signal processor (DSP), a microprocessor, a graphics processing unit (GPU), an artificial intelligence (AI) processor, or a time controller (TCON) that processes a digital image signal. However, the processor 130 is not limited thereto, but may include one or more of a central processing unit (CPU), a micro controller unit (MCU), a micro processing unit (MPU), a controller, an application processor (AP), a communication processor (CP), and an ARM processor, or may be defined by these terms. In addition, the processor 130 may be implemented by a system-on-chip (SoC) or a large scale integration (LSI) in which a processing algorithm is embedded, or may be implemented in the form of an application specific integrated circuit (ASIC) and a field programmable gate array (FPGA). In addition, the processor 130 may perform various functions by executing computer executable instructions stored in the memory 110.

The processor 130 may be connected to the communication interface 120 and the memory 110 to control the electronic device 100.

The processor 130 may be connected to the memory 110 to control the electronic device 100.

In addition, the processor 130 may execute at least one instruction to compare an index value included in a delete request with a plurality of index values stored in the memory 110 of the electronic device 100 when a delete request including the index value corresponding to transaction information is received, delete the transaction information corresponding to the index value included in the delete request from the memory 110 of the electronic device 100 based on the comparison result, generate verification data corresponding to the deletion of the transaction information, and control the communication interface 120 of the electronic device 100 to transmit the generated verification data to the external server included in the blockchain network.

The processor 130 may receive a user's delete request. The user's delete request may include information related to the transaction information that the user wants to delete.

For example, the information related to the transaction information may include the index value corresponding to the transaction information.

The processor 130 may identify a deletion target based on the index value included in the user's delete request. Specifically, the processor 130 may identify whether there is the index value included in the user's delete request among a plurality of index values stored in the memory 110 of the electronic device 100.

When there is no index value included in the user's delete request in the memory 110 of the electronic device 100, the processor 130 may determine that there is no deletion target in the electronic device 100, and may transmit the result that the deletion target does not include the deletion target to the external server.

When there is the index value included in the user's delete request in the memory 110 of the electronic device 100, the transaction information corresponding to the index value may be deleted. The transaction information stored in the memory 110 of the electronic device 100 may include transaction details and the index values corresponding to the transaction details. Accordingly, the processor 130 may identify the transaction information including the index value based on the index value, and may delete the transaction details included in the identified transaction information.

Here, when the processor 130 deletes the transaction information or the transaction details from the memory 110 of the electronic device 100, the processor 130 may generate verification data that may verify the deletion operation of the transaction information. After transmitting the delete request, a user may want to confirm whether the deletion target that he/she wants to delete is actually deleted. Accordingly, the processor 130 may generate verification data that may verify whether the deletion operation is performed.

Here, the verification data may include information indicating whether the delete operation is performed on the transaction information corresponding to the index value included in the delete request in the memory 110 of the electronic device 100.

Here, the verification data may refer to data that may prove that an operation performed by the electronic device 100 has been performed. When the deletion operation is performed in the electronic device 100, the processor 130 of the electronic device 100 may validate whether the deletion operation has actually been performed, and may generate verification data as the validation result. The processor 130 of the electronic device 100 may generate verification data using a trusted execution environment. The trusted execution environment may refer to a secure execution environment provided by a security area within the main processor, and may refer to an environment for protecting personal information. In addition, the processor 130 of the electronic device 100 may generate verification data using a function of software guard extension (SGX) of Intel™. The processor 130 of the electronic device 100 may generate verification data using a validation method by hardware or software, and the processor 130 of the electronic device 100 performs verification on a specific operation in various methods other than the above-described examples.

In addition, the verification data may include at least one of contents of the delete request, the index value included in the delete request, identification information of the electronic device 100 that generates the verification data, delete result information, and time information at which the delete operation is performed.

In addition, the verification data may be directly generated by the electronic device 100. The processor 130 of the electronic device 100 may request an external server (environmental verification server) for additional validation related to the verification data from a separate server in order to increase the reliability of the verification data in addition to the verification data. In order to distinguish the verification data directly generated by the electronic device 100 from data related to additional validation, the validation result received from the external server (environment verification server) is described as verification data.

Meanwhile, the processor 130 of the electronic device 100 may request the environmental verification server to validate the hardware environment of the electronic device 100 or the software environment of the electronic device 100 for generating verification data, and the processor may control the communication interface 120 of the electronic device 100 to transmit the verification data to the external server when the verification data is received from the environmental verification server.

Here, the environment verification server may confirm whether the verification data generated by the electronic device 100 is generated in the correct environment without forgery or falsification. For example, the environment verification server may confirm whether the hardware or software installed in the electronic device 100 is genuine. In addition, the environment verification server may confirm whether hacking hardware or hacking software is installed in the electronic device 100. The environment verification server may determine whether the hardware environment or the software environment of the electronic device 100 is normal, and may generate the verification data as the determination result. In addition, the environment verification server may transmit the generated verification data to the electronic device 100.

A detailed description related to the verification data will be described later with reference to FIG. 11.

Meanwhile, the off-chain network 1000 may include a plurality of electronic devices including the electronic device 100 and other electronic devices, and each of the electronic device 100 and other electronic devices may store transaction information and blockchain data that does not include the transaction information. A detailed description related thereto will be described later with reference to FIG. 6.

On the other hand, although it has been described that the electronic device 100 performs an operation of receiving verification data from each of the plurality of electronic devices and analyzing whether or the delete completion is performed, the operation of analyzing whether the delete completion is performed in the server 200 according to the implementation example may be performed. A detailed description related thereto will be described later with reference to FIGS. 12 and 13.

Meanwhile, the processor 130 may transmit the generated verification data to the external server. Here, the external server may refer to a device constituting the blockchain network 2000. Referring to FIG. 1A, the external server may refer to the server 200. In addition, referring to FIG. 1B, the external server may refer to at least one of the first server 300-1, the second server 300-2, and the server 200.

Meanwhile, the processor of the electronic device 100 may request the deletion authority information from the external server when the delete request is received, and delete the transaction information corresponding to the received delete request when the deletion authority information is received from the external server.

Here, the deletion authority information may be obtained based on a smart contract stored in the external server, and the smart contract may include at least one of the storage authority information of the electronic device 100 and the deletion authority information of the electronic device 100.

Here, the smart contract may refer to making and executing various types of contracts based on the blockchain. Specifically, the smart contract may be a program that records the contract conditions in the blockchain and automatically executes the contract when the contract conditions are satisfied. A detailed description related to the smart contract will be described later with reference to FIGS. 7 and 8.

Meanwhile, the verification data may be proof of execution (POE) data corresponding to the deletion of the transaction information.

The verification data may be a validation result of an operation performed by the electronic device 100. The POE may refer to validation on whether the operation performed by the electronic device 100 has actually performed.

Meanwhile, the off-chain network 1000 may include a plurality of nodes 100-1, 100-2, 100-3, 100-4, 100-5, and 100-6. Here, it is assumed that the transaction information is stored in a node A 100-1, a node C 100-3, and a node D 100-4. It is assumed that a user gives a command to delete the transaction information stored in the node A 100-1, the node C 100-3, and the node D 100-4. Here, the node A 100-1, the node C 100-3, and the node D 100-4 may each delete the stored transaction information and generate the POE data. The POE data may be validated by other nodes.

For example, a node E 100-5 may increment the POE data generated by the node D 100-4. Here, it is assumed that the node E 100-5 maliciously determines that the POE data of the node D 100-4 is incorrect. The node E 100-5 may transmit to the blockchain network 2000 that the POE data of the node D 100-4 is incorrect. Here, the blockchain network 2000 may impose a penalty on the node D 100-4. The penalty may refer to being excluded from the off-chain network 1000. The node D 100-4 may receive information that it is a penalty target from the blockchain network 2000. Here, the node D 100-4 may transmit a challenge transaction to the blockchain network 2000 to assert that the POE data is correct. Here, the challenge transaction may include the validation result of the node E 100-5 that validates the POE data generated by the node D 100-4 and the generated POE data. When the blockchain network 2000 receives the challenge transaction, it may request all nodes of the off-chain network 1000 to re-validate the POE data generated by the node D 100-4. The blockchain network 2000 receives the re-validation result, and when more than half of the nodes determine that the POE data of the node D 100-4 is correct, the blockchain network 2000 may cancel the penalty imposed on the node D 100-4 and impose a penalty on the node E 100-5. Meanwhile, here, although it has been described that the blockchain network 2000 determines the POE data, in actual implementation, one of a plurality of servers included in the blockchain network 2000 may analyze the POE data based on the smart contract. In this way, it is possible to determine the act of the node E 100-5 maliciously forging the validation result, and increase the reliability of the validation result.

Meanwhile, in the above-described embodiment of the disclosure, during the re-validation process, more than half of the nodes may maliciously transmit the verification result that the POE data generated by the node D 100-4 is incorrect. Here, the blockchain network 2000 may transmit information indicating that the penalty is maintained to the node D 100-4 based on the re-validation result. When the node D 100-4 receives information indicating that the penalty is maintained even in the re-validation result, the node D 100-4 may transmit an appeal transaction. The appeal transaction may be transmitted to the blockchain network 2000. When the blockchain network 2000 receives the appeal transaction, it may request a plurality of servers included in the blockchain network 2000 to perform the re-validation (another re-validation). Here, the plurality of servers included in the blockchain network 2000 may analyze the verification result by performing the re-validation operation. When more than half of the plurality of servers included in the blockchain network 2000 determine that the POE data of the node D 100-4 is correct, it is possible to cancel the penalty imposed on the node D 100-4 and impose the penalty on the node E 100-5. In this way, the plurality of nodes included in the off-chain network 1000 may determine an action for forgery of the verification result, and the reliability of the validation result may be increased.

On the other hand, the above-described data storage system may be generated by including the transaction information in the block or without including the transaction information in the block by classifying the types of user commands. Sensitive personal information is stored in the off-chain network 1000 to improve security, and other information may be included in a block to disclose information transparently. When all the transaction information is not included in the block, a user may not be able to easily obtain the information and may not trust the blockchain data. However, the data storage system of the disclosure may appropriately adjust security and transparency by classifying types of user commands.

Meanwhile, the above-described data storage system may verify that specific transaction information is deleted in response to the user's delete request. A user may not want his/her transaction information to be permanently stored in the off-chain network 1000. Accordingly, when the user requests to delete his/her transaction information, the off-chain network 1000 may delete the transaction information corresponding to the delete request. Here, the data storage system of the application may generate the verification data for the deletion operation. A user may obtain the verification data indicating that his/her transaction information has been deleted, and may have confidence based on the result that the deletion operation is actually performed. Therefore, unlike simply notifying the delete completion, the data storage system according to the disclosure may provide the verification data for the deletion operation to the user.

Meanwhile, in the above description, it has been described that the information related to the transaction information included in the user's delete request is an index value.

However, as another example, the information related to the transaction information may include text information including transaction details.

Meanwhile, as another example, the information related to the transaction information may include information related to a block. The information related to the block may be unique identification information of a specific block. In a specific block, index values corresponding to transaction details may be stored as illustrated in FIG. 2B. The user's delete request may include identification information on a specific block, and the processor 130 may obtain the index value corresponding to the transaction information based on the block identification information included in the user's delete request.

Meanwhile, as another example, the information related to the transaction information may include only the text information. Here, the index value corresponding to the transaction information may be obtained from the off-chain network 1000. Based on the text information included in the user delete request, the off-chain network 1000 may identify the transaction information corresponding to the text information and obtain the index value corresponding to the transaction information.

Figure 3B:
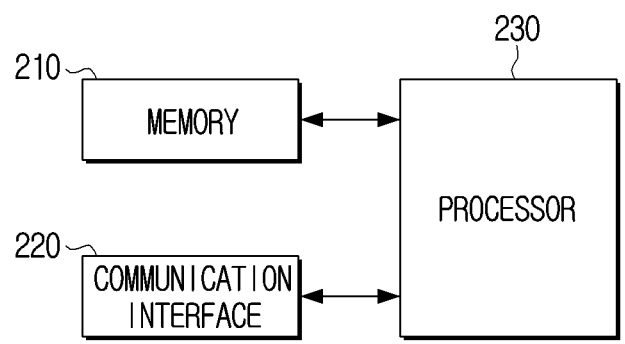
FIG. 3B is a block diagram illustrating a management server according to an embodiment of the disclosure.

FIG. 3B is a block diagram illustrating a management server according to an embodiment of the disclosure.

Referring to FIG. 3B, the server 200 may include a memory 210, a communication interface 220, and a processor 230.

The server 200 may be an electronic device that performs the same function as the electronic device 100 of FIG. 3A. In addition, the memory 210, the communication interface 220, and the processor 230 may perform the same functions as the memory 110, the communication interface 120, and the processor 130 of FIG. 3A. Accordingly, redundant descriptions of basic functions will be omitted.

The memory 210 of the server 200 may store block data including an index value corresponding to transaction information and blockchain data including the block data. A detailed description related to the blockchain data has been described in FIG. 2B.

The processor 230 may be connected to the memory 210 of the server 200 to control the server 200.

In addition, when a delete request of transaction information is received, the processor 230 may generate block data including information on the received delete request, add the generated block data to the blockchain data, identify an index value included in the delete request, and control the communication interface 220 to transmit the delete request for the transaction information corresponding to the identified index value to the external electronic device.

Here, the processor 230 may receive a user's delete request. The user's delete request may be a request to delete transaction information.

The user's delete request may include the information on the delete request. The information on the delete request may include at least one of subject information, deletion target information to be deleted, and an index value corresponding to the deletion target information.

The subject information may include information on who is a subject requesting deletion. The processor 230 may record a subject requesting deletion in the block.

The deletion target information may be transaction information. In addition, the user's delete request may include an index value corresponding to transaction information. The index value may be used to specify a deletion target. For example, the index value may be used as identification information, and may be used to identify specific transaction information that a user wants to delete from among the plurality of pieces of transaction information.

Meanwhile, when the delete request is received, the processor 230 may record the information on the delete request in the block data. In addition, the processor 230 may generate the block data in which the information on the delete request is recorded. Generating the block data may refer to determining the block data without further writing additional information in the block data. The processor 230 may acquire new blockchain data by adding the determined block data to the existing blockchain data.

Here, the processor 230 may obtain the index value included in the delete request after generating the block data including the information on the delete request and adding the generated block data to the blockchain data. Then, the processor 230 may transmit the obtained index value to the external electronic device. Here, the external electronic device may refer to a device included in the off-chain network 1000. Referring to FIG. 1A, the external electronic device may refer to the electronic device 100. Referring to FIG. 1B, the external electronic device may refer to at least one node among a plurality of nodes 100-1 to 100-6.

The reason that the processor 230 transmits the index value to the external electronic device is to specify transaction information. Here, the external electronic device may include a plurality of pieces of transaction information, and may store index values corresponding to each piece of transaction information. Accordingly, the external electronic device needs to know which transaction information is to be deleted from among the plurality of pieces of stored transaction information. Accordingly, the processor 230 may transmit the index value for specifying the transaction information to the external electronic device. The external electronic device may identify the transaction information corresponding to the index value based on the received index value, and delete the identified transaction information.

For example, the processor 230 may request to delete the transaction information stored in the external electronic device, and identify the deletion target as the index value.

Meanwhile, the processor 230 of the server 200 may obtain result information of the delete request based on verification data when verification data corresponding to the delete request is received from the external electronic device, generate block data including the result information of the delete request, and add block data including result information of the generated delete request to the blockchain data.

For the verification data, as described in FIG. 3A, a redundant description thereof will be omitted.

Meanwhile, when the verification data is received from a plurality of external electronic devices, respectively, the processor 230 of the server 200 may compare the plurality pieces of received verification data and obtain result information of the delete request based on the comparison result.

Here, the processor 230 of the server 200 may identify verification data including information different from the result information of the delete request among the plurality of received verification data, and determine that the identified verification data is forged.

Here, the processor 230 of the server 200 may identify an external electronic device that transmits the forged verification data, and change storage authority information of the identified external electronic device. Changing the storage authority information may refer to changing authority so that the external electronic device that has transmitted the forged verification data may no longer store transaction information.

Meanwhile, the processor 230 of the server 200 may determine whether to maintain at least two or more electronic devices in an off-chain network based on the comparison result.

When the processor 230 of the server 200 receives a plurality of pieces of verification data, the processor 230 may analyze whether the deletion is complete. The verification data may include information on whether the deletion is complete in each electronic device. When the deletion operation is complete in all electronic devices, the processor 230 of the server 200 may finally determine that the deletion is completed. Finally, when it is determined that the deletion is complete, it may be determined that the plurality of electronic devices that have transmitted the verification data are continuously maintained in the off-chain network 1000.

However, when information indicating that deletion is not complete is included in some of the plurality of pieces of verification data, the processor 230 of the server 200 may additionally analyze the result of the verification data.

Specifically, the contents of verification data may be divided into delete completion and deletion failure, and it is possible to determine which contents of the delete completion and the deletion failure is more. When it is identified that there are more delete completion results, the processor 230 of the server 200 may determine not to maintain at least one electronic device that has transmitted the deletion failure in the off-chain network 1000. In addition, the processor 230 of the server 200 may transmit, to the off-chain network 1000, a control signal instructing to exclude the electronic device that has transmitted the deletion failure from the off-chain network 1000. On the other hand, when it is identified that there are more delete failure results, the processor 230 of the server 200 may determine not to maintain at least one electronic device that has transmitted the deletion success in the off-chain network 1000. In addition, the processor 230 of the server 200 may transmit, to the off-chain network 1000, a control signal instructing to exclude the electronic device that has transmitted the deletion success from the off-chain network 1000.

An embodiment of comparing a plurality of pieces of verification data will be described later with reference to FIGS. 12 and 13.

Meanwhile, the memory 210 of the server 200 may store smart contract information, and the smart contract may include at least one of storage authority information of the external electronic device and deletion authority information of the external electronic device.

Figure 7:
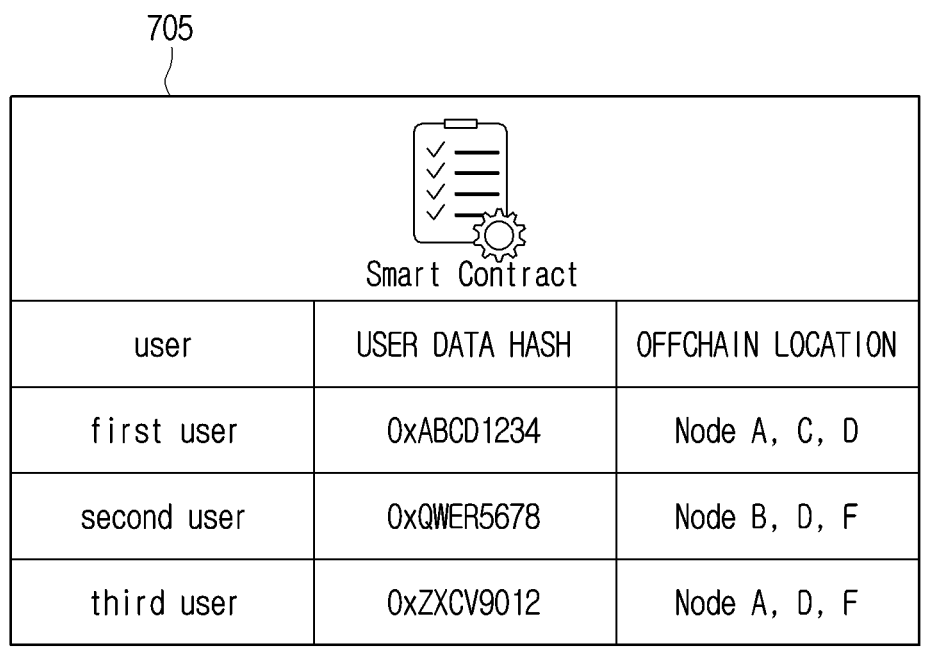
FIG. 7 is a diagram illustrating a smart contract according to an embodiment of the disclosure.

The smart contract information is described in FIGS. 3A and 7, and therefore, a redundant description thereof will be omitted.

Meanwhile, the processor 230 of the server 200 may obtain identification information of a user terminal device that transmits the delete request, and determine whether the user terminal device has authority to delete transaction information corresponding to the index value included in the delete request based on the obtained identification information of the user terminal device.

Meanwhile, the verification data may include information indicating whether the delete operation is performed on the transaction information corresponding to the index value included in the delete request in the external electronic device.

Here, the verification data may include at least one of contents of the delete request, the index value included in the delete request, identification information of the electronic device that generates the verification data, delete result information, and time information at which the delete operation is performed.

Figure 4:
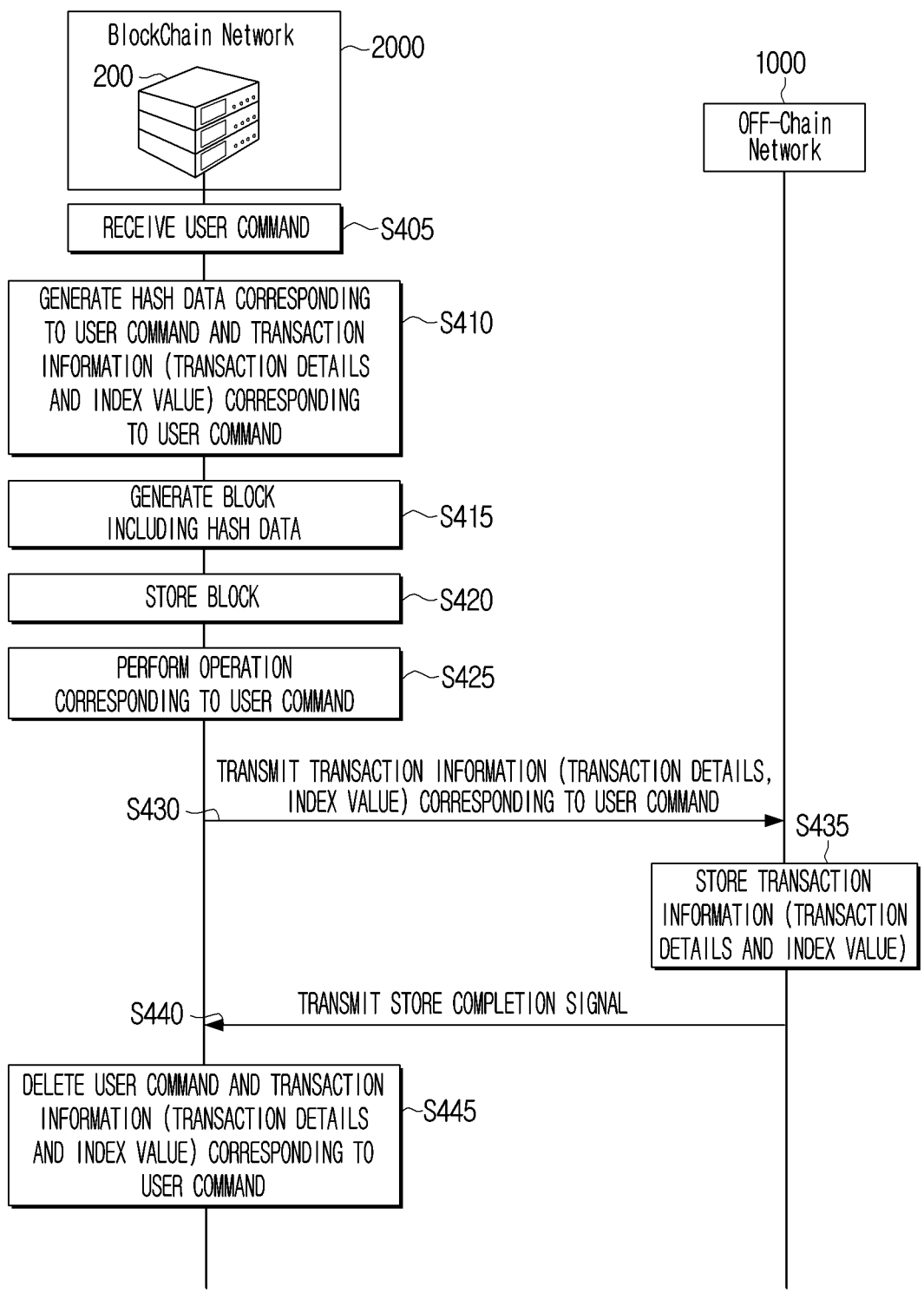
FIG. 4 is a flowchart illustrating an operation of generating a block corresponding to a user command according to an embodiment of the disclosure.

FIG. 4 is a flowchart illustrating an operation of generating a block corresponding to a user command according to an embodiment of the disclosure.

Referring to FIG. 4, a blockchain network 2000 may generate a block in the off-chain manner. The server 200 included in the blockchain network 2000 may receive a user command at operation S405. Then, the server 200 may generate hash data corresponding to a user command and transaction information corresponding to the user command at operation S410. Here, the transaction information may refer to transaction details and index information corresponding to the transaction details. Then, the server 200 may generate a block including only the generated hash data at operation S415. The generated block may include only an index value for transaction information and may not include transaction details. For example, it may be difficult to know which the transaction details are written in the generated block. For the protection of personal information, the transaction contents may be stored in a separate storage included in the off-chain network 1000.

The server 200 may store the generated block in the memory of the server 200 at operation S420. Then, the server 200 may perform an operation corresponding to the user command at operation S425. In addition, the server 200 may transmit the transaction information (including transaction details and index values corresponding to the transaction details) corresponding to the user command to the off-chain network 1000 at operation S430.

The off-chain network 1000 may receive the transaction information (including transaction details and the index values corresponding to the transaction details) and store the received transaction information in a separate storage included in the off-chain network 1000 at operation S435. Then, the off-chain network 1000 may transmit a signal that the storage of the transaction information is completed to the server 200 at operation S440.

Then, when the server 200 receives the signal that the storage of the transaction information is completed from the off-chain network 1000, a user command and transaction information (including transaction details and index values corresponding to the transaction details) corresponding to the user command may be deleted at operation S445. The deletion operation does not delete the index value recorded in the block, but may refer to deleting the transaction information stored separately. When operation S445 is completed, the transaction details of the transaction information may be stored only in the off-chain network 1000. Therefore, unless the off-chain network 1000 is hacked, a third party may not be able to easily access the transaction details.

Figure 5A:
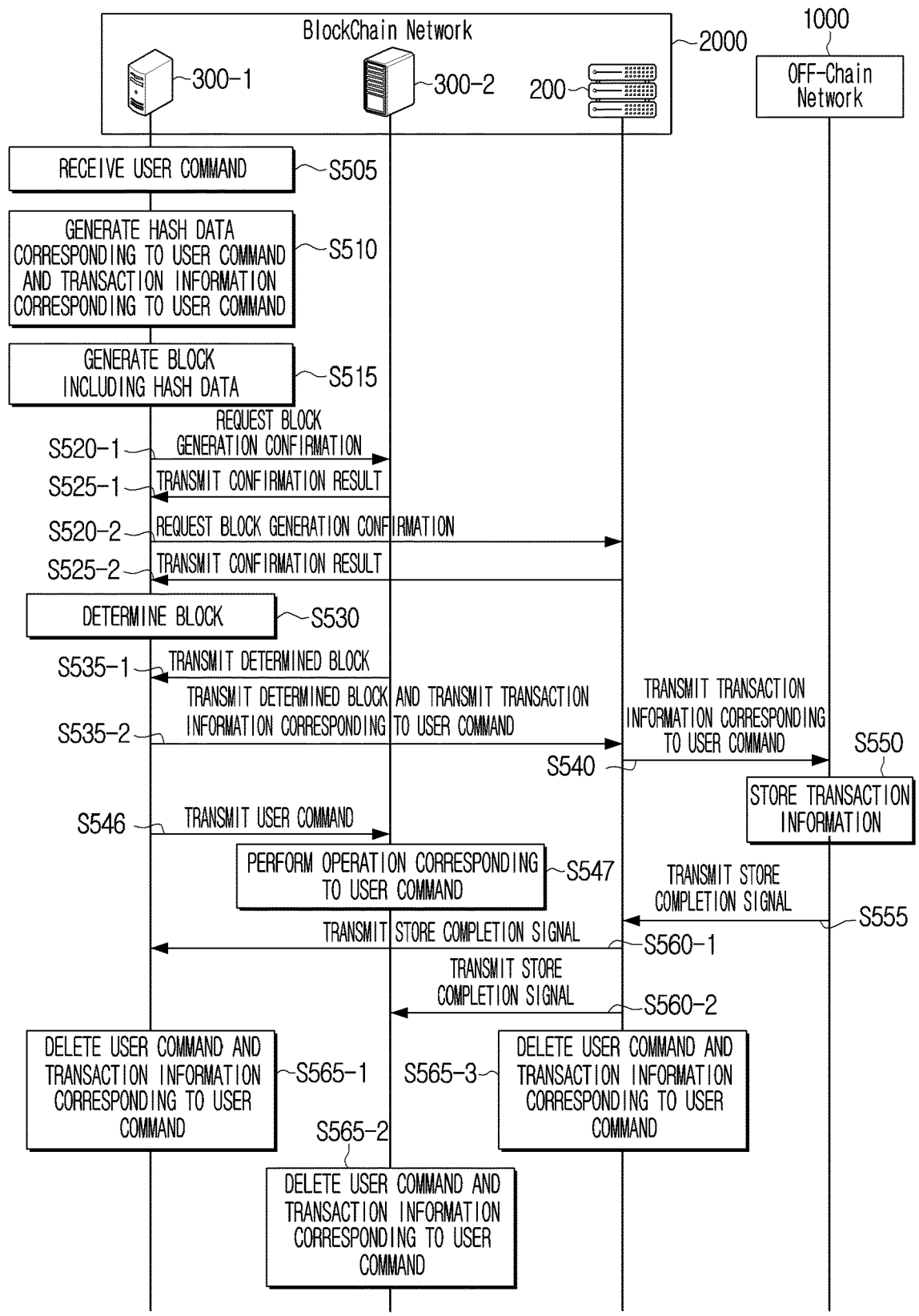
FIG. 5A is a flowchart illustrating an operation of generating a block corresponding to a user command according to an embodiment of the disclosure.

FIG. 5A is a flowchart illustrating an operation of generating a block corresponding to a user command according to an embodiment of the disclosure.

Referring to FIG. 5A, the first server 300-1 may receive a user command at operation S505.

In addition, the first server 300-1 may generate hash data corresponding to a user command and transaction information corresponding to the user command at operation S510.

Referring to FIG. 5A, an operation of the first server 300-1 to generate a block is assumed. The first server 300-1 may generate a block including hash data at operation S515. Here, the generated block may not include transaction information. The operation of generating a block that does not include transaction information has been described with reference to FIGS. 2A and 2B.

Meanwhile, the first server 300-1 may request confirmation of block generation from a plurality of servers (or devices) included in the blockchain network 2000. Specifically, the first server 300-1 may request confirmation of block generation from the second server 300-2 included in the blockchain network 2000 at operation S520-1. Here, the second server 300-2 may transmit the confirmation result to the first server 300-1 in response to the received confirmation request for block generation operation S525-1.

The first server 300-1 may request the confirmation of the block generation from the management server 200 included in the blockchain network 2000 at operation S520-2. Here, the management server 200 may transmit the confirmation result to the first server 300-1 in response to the received confirmation request for block generation at operation S525-2.

Here, the operation of requesting the confirmation of the block generation may refer to an operation of confirming whether the block generation authority exists.

It is assumed that both the second server 300-2 and the management server 200 determine that the first server 300-1 has authority to generate a block. The first server 300-1 may receive a confirmation result from a plurality of servers included in the blockchain network 2000, and determine the generated block based on the plurality of received confirmation results at operation S530.

Meanwhile, although it has been described that operations S520-1, S525-1, S520-2, and S525-2 are performed in FIG. 5A, according to another embodiment of the disclosure, the operation of transmitting the block generation confirmation request and the confirmation result may not be performed. In this case, the first server 300-1 may share the generated (valid) block with a plurality of servers (or devices) included in the blockchain network 2000. In addition, the plurality of servers (or devices) that have shared the block may determine whether the received block satisfies the "consensus rule" (preset condition), and may adopt the received block when the received block meets the "consensus rule." Here, the plurality of servers (or devices) included in the blockchain network 2000 may not share the result of whether the shared block is adopted with other servers (or devices). The first server 300-1 may immediately determine the generated block without separately transmitting the block generation confirmation request to the plurality of servers (or devices) included in the blockchain network 2000.

Here, the first server 300-1 may transmit a user command to the second server 300-2 at operation S546. The second server 300-2 receiving the user command may perform an operation corresponding to the user command at operation S547. For example, it is assumed that the first server 300-1 is a server that controls applications installed in the user terminal device, and that the second server 300-2 is a server that controls home appliances. Here, it is assumed that the user inputs the user command for turning on a power supply of the home appliance to the user terminal device through an application. The first server 300-1 may receive the user command and transmit the user command to the second server 300-2. In addition, the second server 300-2 may transmit the user command to the home appliance to be controlled. The operation of transmitting the user command to the home appliance to be controlled may correspond to operation S547.

Meanwhile, the first server 300-1 may store the determined block in the memory of the first server 300-1. In addition, the first server 300-1 may transmit the determined block to the plurality of servers included in the blockchain network 2000. The first server 300-1 may transmit the determined block to the second server 300-2 at operation S535-1. Then, the first server 300-1 may transmit the determined block and the transaction information corresponding to the user command to the management server 200 at operation S535-2.

The management server 200 may transmit the transaction information corresponding to the user command to the off-chain network 1000 at operation S540. In addition, the off-chain network 1000 may store the transaction information corresponding to the user command at operation S550. Specifically, the transaction information may be stored in a predefined node among a plurality of nodes included in the off-chain network 1000. The information on the predefined node may be included in the smart contract.

When the transaction information is stored in the off-chain network 1000, the off-chain network 1000 may transmit information indicating that the storage operation is completed to the blockchain network 2000. Specifically, the off-chain network 1000 may transmit a store completion signal to the management server 200 included in the off-chain network 1000. In addition, the management server 200 may transmit the store completion signal to the first server 300-1 at operation S560-1. In addition, the management server 200 may transmit the store completion signal to the second server 300-2 at operation S560-2.

When the first server 300-1 receives the store completion signal, the first server 300-1 may delete the user command stored in the memory of the first server 300-1 and the transaction information corresponding to the user command at operation S565-1.

In addition, when the second server 300-2 receives the store completion signal, the first server 300-2 may delete the user command stored in the memory of the second server 300-2 and the transaction information corresponding to the user command at operation S565-2.

In addition, when the management server 200 transmits the store completion signal to the first server 300-1 and the second server 300-2, the management server 200 may delete the user command stored in the memory of the management server 200 and the transaction information corresponding to the user command at operation S565-3.

Meanwhile, in the description of FIG. 5A, operations S565-1, S565-2, and S565-3 are described as deleting both the user commands and the transaction information, but according to an embodiment of the disclosure, may be implemented in a form in which either the user command or the transaction information is deleted.

On the other hand, in the description of FIG. 5A, it is described that the first server 300-1 generates the block in the blockchain network 2000, but according to an embodiment of the disclosure, the block may be generated in any server included in the blockchain network 2000. In FIG. 5A, the embodiment in which the block is generated in the second server 300-2 instead of the first server 300-1 has been described.

Meanwhile, in operations S555, S560-1, S560-2, S565-1, S565-2, and S565-3, when the off-chain network 1000 transmits the store completion signal to the blockchain network 2000, it has been described as deleting the user command and the transaction information corresponding to the user command from the server (or device) included in the blockchain network 2000. However, according to the implementation example, the off-chain network 1000 may transmit the store completion signal only to some servers (or devices) rather than all servers (or devices) included in the blockchain network 2000. In addition, only some servers (or devices) included in the blockchain network 2000 may perform an operation of deleting the user command and the transaction information corresponding to the user command. For example, only the first server 300-1 that transmits the user command and the second server 300-2 that receives the user command may store the transaction information corresponding to the user command, and only the first server 300-1 and the second server 300-2 may perform an operation of deleting the user command and the transaction information corresponding to the user command.

Figure 5B:
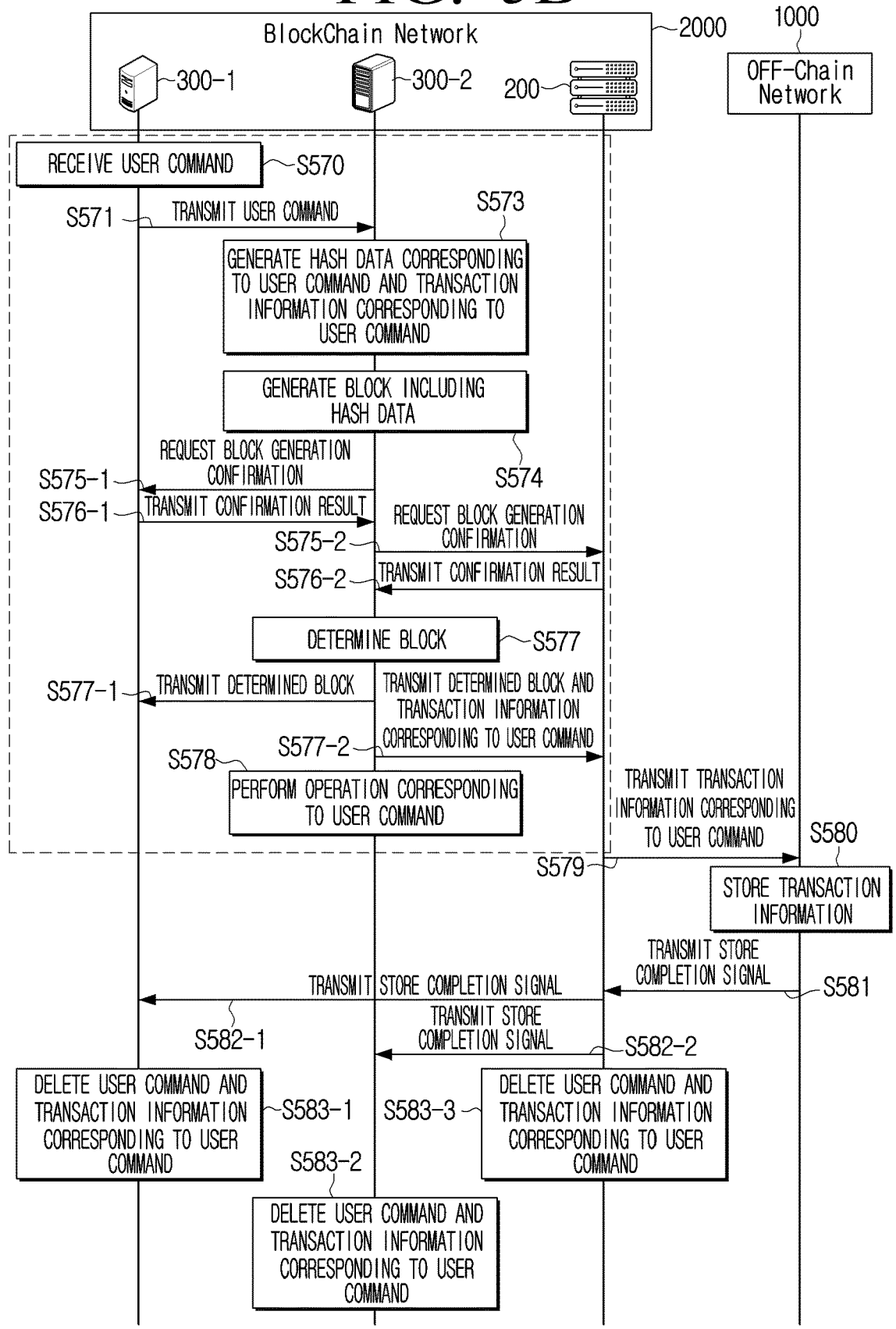
FIG. 5B is a flowchart illustrating an operation of generating a block corresponding to a user command according to an embodiment of the disclosure.

FIG. 5B is a flowchart illustrating an operation of generating a block corresponding to a user command according to an embodiment of the disclosure.

Referring to FIG. 5B, the first server 300-1 may receive a user command at operation S570. Here, the first server 300-1 may transmit the user command to the second server 300-2 at operation S571.

In addition, the second server 300-2 may generate hash data corresponding to a user command and transaction information corresponding to the user command at operation S573. In addition, the second server 300-2 may generate a block including the generated hash data at operation S574.

In addition, the second server 300-2 may request confirmation of block generation from a plurality of servers included in the blockchain network 2000. Specifically, the second server 300-2 may request confirmation of block generation from the first server 300-1 at operation S575-1. Here, the first server 300-1 may determine whether the second server 300-2 has authority to generate the block, and may transmit the confirmation result to the second server 300-2 at operation S576-1. In addition, the second server 300-2 may request confirmation of block generation from the management server 200 at operation S575-2. Here, the management server 200 may determine whether the second server 300-2 has authority to generate the block, and may transmit the confirmation result to the second server 300-2 at operation S576-2.

It is assumed that both the first server 300-1 and the management server 200 determine that the second server 300-2 has authority to generate a block. The second server 300-2 may receive the confirmation result from the first server 300-1 and the management server 200 to confirm the block at operation S577.

Meanwhile, although it has been described that operations S575-1, S576-1, S575-2, S576-2, and S525-2 are performed in FIG. 5B, according to another embodiment of the disclosure, the operation of transmitting the block generation confirmation request and the confirmation result may not be performed. A detailed description related thereto has been described with reference to FIG. 5A, and therefore, a redundant description thereof will be omitted.

In addition, the second server 300-2 may transmit the determined block to the plurality of servers included in the blockchain network 2000. Specifically, the second server 300-2 may transmit the determined block to the first server 300-1 at operation S577-1. In addition, the second server 300-2 may transmit the determined block and the transaction information corresponding to the user command to the management server 200 at operation S577-2. In addition, the second server 300-2 may perform an operation corresponding to the received user command at operation S572.

In addition, the management server 200 may transmit the transaction information corresponding to the user command to the off-chain network 1000 at operation S579. On the other hand, operations S580, S581, S582-1, S582-2, S583-1, S583-2, and S583-3 performed in the off-chain network 1000 after that may corresponding to operations S550, S555, S560-1, S560-2, S565-1, S565-2, and S565-3 of FIG. 5A. Therefore, a redundant description thereof will be omitted.

Meanwhile, in FIGS. 5A and 5B, it has been described that operations S547 and S578 of performing the operation corresponding to the user command are performed after the block is determined. However, according to the implementation example, the operation corresponding to the user command may be performed before the block is determined.

Figure 6:
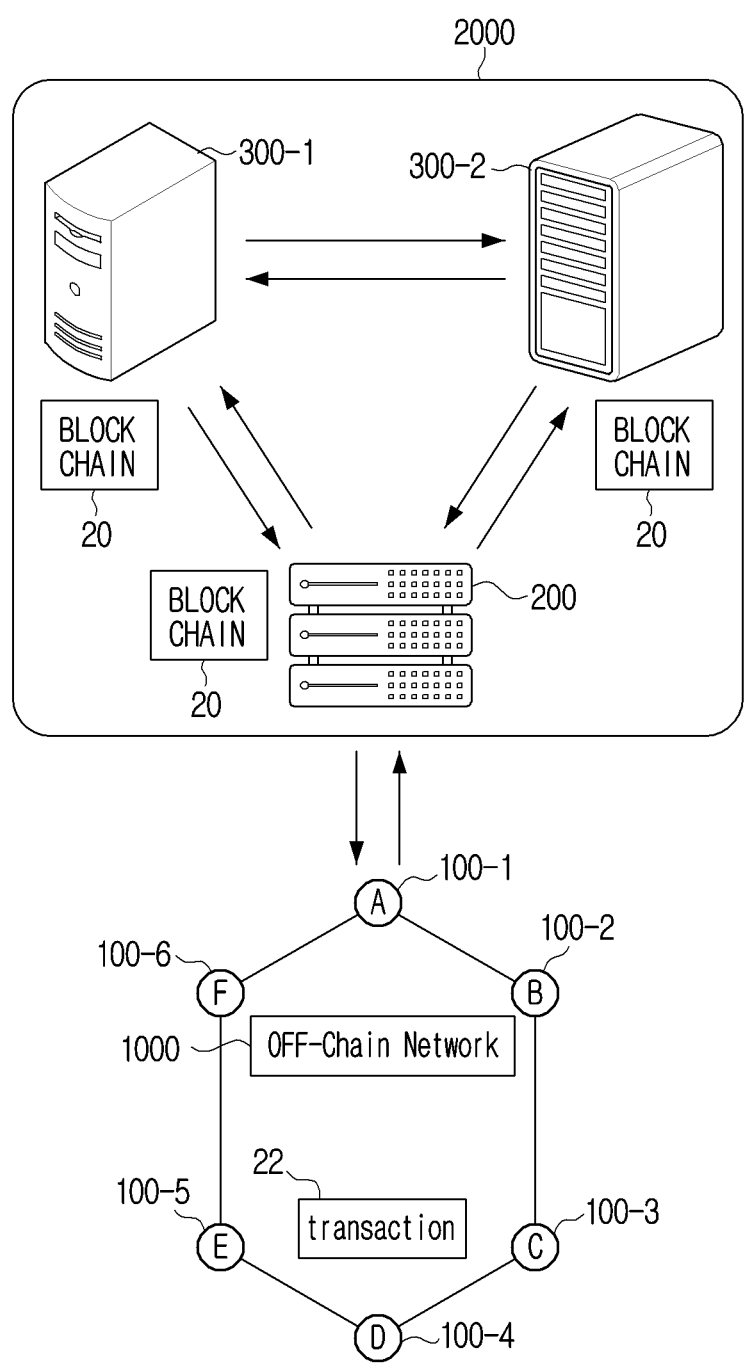
FIG. 6 is a diagram illustrating an operation of storing blockchain data and transaction information according to an embodiment of the disclosure.

FIG. 6 is a diagram illustrating an operation of storing blockchain data and transaction information according to an embodiment of the disclosure.

Referring to FIG. 6, the blockchain network 2000 may generate and share a block. It is assumed that the blockchain network 2000 includes the first server 300-1, the second server 300-2, and the management server 200. When the block is generated in one of a plurality of servers included in the blockchain network 2000, a new block may be combined with the existing blockchain data. New blocks from the existing blockchain data may be combined to generate new blockchain data 20. Here, the newly generated blockchain data 20 may be shared and stored in each of a plurality of servers included in the blockchain network 2000. Specifically, the first server 300-1, the second server 300-2, and the management server 200 may store the same blockchain data. The blockchain data 20 may refer to the blockchain data 20 of FIG. 2B.

Here, the new block may be generated in response to the user command. When the user command is input to the blockchain network 2000, the blockchain network 2000 may generate hash data corresponding to the user command and transaction information 22 corresponding to the user command. The blockchain network 2000 may generate a new block using the hash data corresponding to the user command. Here, the generated new block may not include transaction details (not including text information) among the transaction information. Here, the blockchain network 2000 may transmit the transaction information 22 corresponding to the user command to the off-chain network 1000. Here, the transaction information 22 transmitted to the off-chain network 1000 may include transaction details and index values corresponding to transaction details.

The off-chain network 1000 may store the transaction information 22 received from the blockchain network 2000 in at least one of the plurality of nodes 100-1, 100-2, 100-3, 100-4, 100-5, and 100-6.

When the transaction information 22 is stored in the off-chain network 1000, the blockchain network 2000 may delete the stored transaction information 22. Finally, the block may be stored in the blockchain network 2000, and the transaction information 22 may be stored in the off-chain network 1000.

FIG. 7 is a diagram illustrating a smart contract according to an embodiment of the disclosure.

Referring to FIG. 7, the blockchain network 2000 may include a smart contract. The smart contract may refer to making and executing various types of contracts based on the blockchain. Specifically, the smart contract may be a program that records the contract conditions in the blockchain and automatically executes the contract when the contract conditions are satisfied.

The smart contract may store information on which node of the off-chain network 1000 a block newly generated based on a user command and transaction information corresponding to the user command are stored in. For example, the smart contract may include name information, data hash value information, and node information to be stored in an off-chain network for a plurality of users. Referring to Table 705, a data hash value of a first user may be "0xABCD1234," and node information corresponding to the first user may be the node A 100-1, the node C 100-3, and the node C 100-3. For example, when the user command of the first user whose user data hash value is "0xABCD1234" is received in the blockchain network 2000, the data storage system may store the block corresponding to the user command and the transaction information corresponding to the user command in node A 100-1, node C 100-3, and node C 100-3 of the off-chain network 1000.

Figure 8:
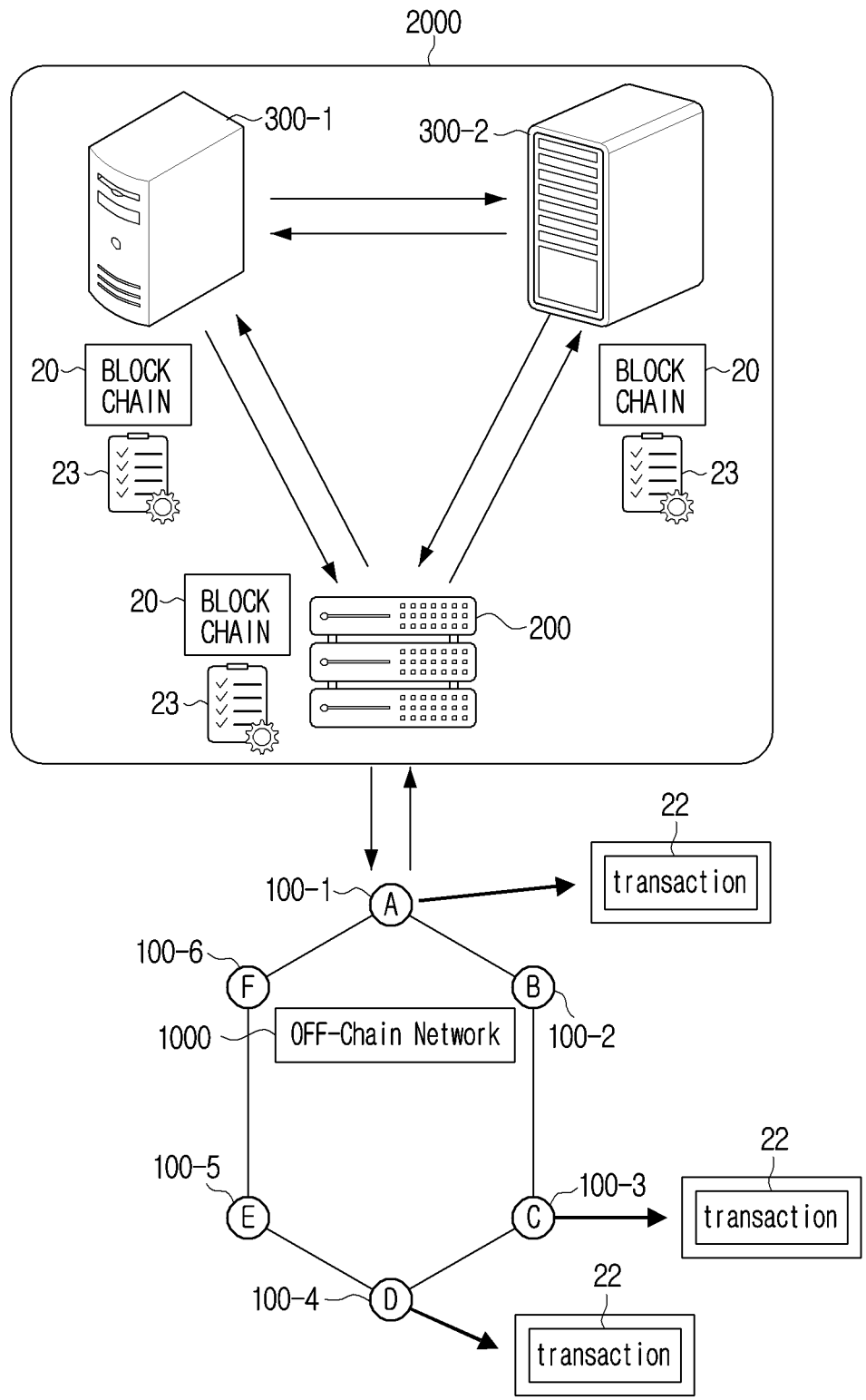
FIG. 8 is a diagram illustrating an operation of distributing and storing blockchain data and transaction information according to an embodiment of the disclosure.

FIG. 8 is a diagram illustrating an operation of distributing and storing blockchain data and transaction information according to an embodiment of the disclosure.

Since the configuration of FIG. 8 has been described with reference to FIG. 6, a redundant description thereof will be omitted. The first server 300-1, the second server 300-2, and the management server 200 included in the blockchain network 2000 may include the blockchain data 20 and a smart contract 23, respectively.

Referring to FIG. 8, the data storage system may store the transaction information 22 in some of the plurality of nodes 100-1, 100-2, 100-3, 100-4, 100-5, and 100-6 included in the off-chain network 1000 based on the smart contract 23 of FIG. 7.

It is assumed that the nodes corresponding to the first user are the node A 100-1, the node C 100-3, and the node C 100-3, and that the user command of the first user is received in the blockchain network 2000. The blockchain network 2000 may generate the block corresponding to the user command of the first user and the transaction information 22 corresponding to the user command of the first user. Here, the blockchain network 2000 may transmit the transaction information 22 to the off-chain network 1000. Here, the blockchain network 2000 may identify node information corresponding to the first user based on the information stored in the smart contract 23. Then, the blockchain network 2000 may transmit the transaction information 22 to the nodes 100-1, 100-3, and 100-4 corresponding to the first user. In addition, the nodes 100-1, 100-3, and 100-4 that have received the transaction information 22 from the blockchain network 2000 may store the transaction information 22.

Figure 9:
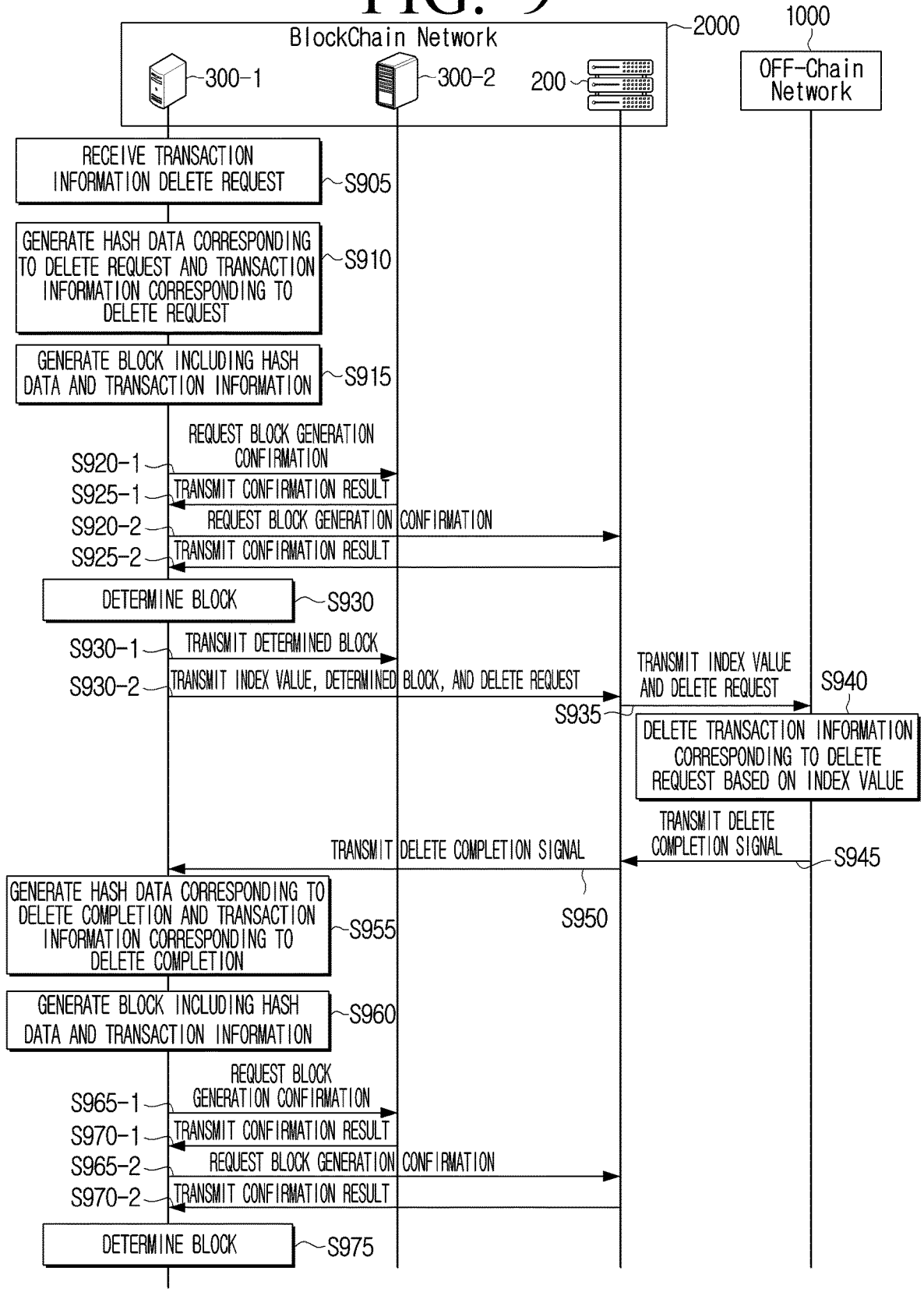
FIG. 9 is a flowchart illustrating an operation of generating a block corresponding to a delete request of transaction information according to an embodiment of the disclosure.

FIG. 9 is a flowchart illustrating an operation of generating a block corresponding to a delete request of transaction information according to an embodiment of the disclosure.

Referring to FIG. 9, the first server 300-1 may receive a delete request for transaction information from the user at operation S905. Here, the delete request may include an index value for transaction information that the user wants to delete. The index value may be directly transmitted by the user to the blockchain network 2000 or obtained by identifying an index value corresponding to the user's delete request in at least one server included in the blockchain network 2000. For example, it is assumed that a delete request related to a specific block is made to the user's delete request. The blockchain network 2000 may identify an index value included in a specific block based on the information related to the specific block.

Here, it is assumed that the first server 300-1 generates a block. The first server 300-1 may generate hash data corresponding to the delete request and transaction information corresponding to the delete request at operation S910. Then, the first server 300-1 may generate a block including hash data and transaction information at operation S915. Here, the first server 300-1 may request confirmation from a plurality of servers included in the blockchain network 2000 whether the first server 300-1 has authority for the generated block. Here, the confirmation operation may correspond to validation or verification. Specifically, the first server 300-1 may request confirmation of block generation from the second server 300-2 at operation S920-1. In addition, the second server 300-2 may determine whether the first server 300-1 has the authority to generate a block, and transmit the determination result (or the confirmation result) to the first server 300-1 at operation S925-1. In addition, the first server 300-1 may request confirmation of block generation from the management server 200 at operation S920-2. In addition, the management server 200 may determine whether the first server 300-1 has the authority to generate a block, and transmit the determination result (or the confirmation result) to the first server 300-1 at operation S925-2.

It is assumed that the first server 300-1 has authority to generate a block. The first server 300-1 may receive the confirmation result for the block generation from the server included in the blockchain network 2000, and when it is identified that the first server 300-1 has the authority to generate a block based on the received confirmation result, the first server 300-1 may confirm the generated block at operation S930.

Meanwhile, although it has been described that operations S920-1, S925-1, S920-2, and S925-2 are performed in FIG. 9, according to another embodiment of the disclosure, the operation of transmitting the block generation confirmation request and the confirmation result may not be performed. A detailed description related thereto has been described with reference to FIG. 5A, and therefore, a redundant description thereof will be omitted.

The first server 300-1 may transmit the determined block to the second server 300-2 at operation S930-1. In addition, the first server 300-1 may transmit an index value corresponding to a delete request, a determined block, and a delete request signal to the management server 200 at operation S930-2.

The management server 200 may transmit an index value corresponding to the received delete request and delete request signal to the off-chain network 1000 at operation S935. The off-chain network 1000 may delete transaction information corresponding to the delete request based on the index value corresponding to the received delete request at operation S940. Operation S940 will be described below with reference to FIGS. 10 and 11.

When the off-chain network 1000 deletes the transaction information, the off-chain network 1000 may transmit a delete completion signal to the blockchain network 2000. Specifically, the off-chain network 1000 may transmit the delete completion signal to the management server 200 at operation S945. In addition, the management server 200 may transmit the delete completion signal to the first server 300-1 at operation S950.

Here, the delete completion signal may include at least one of verification data that verifies the operation that the transaction information has been deleted from the off-chain network 1000 or a control command for changing the state of the smart contract described in FIG. 7. In addition, here, it may mean a control signal for generating a block including information on the delete completion operation.

For example, it is assumed that the transaction information that the user wants to delete is stored in the node A of the off-chain network 1000. Here, the off-chain network 1000 may delete specific transaction information from the node A in response to the user's deletion command, and may generate the verification data for the delete completion. In addition, when the delete completion signal including the verification data is transmitted to the smart contract, the smart contract may identify that deletion has been completed based on the verification data. Here, the information on the delete completion may be included in the block. Specific operations will be described later in operations S955 to S975.

The first server 300-1 may generate the hash data corresponding to the delete completion and the transaction information corresponding to the delete completion based on the received delete completion signal at operations S955. Then, the first server 300-1 may generate the block including the hash data and the transaction information generated in operation S955 at operation S960.

In addition, the first server 300-1 may request the second server 300-2 to confirm the authority for the block generated in operation S960 at operations S965-1. In addition, the second server 300-2 may determine whether the first server 300-1 has the authority to generate a block, and transmit the determination result (or the confirmation result) to the first server 300-1 at operations S970-1.

In addition, the first server 300-1 may request the management server 200 to confirm the authority for the block generated in operation S960 at operations S965-2. In addition, the management server 200 may determine whether the first server 300-1 has the authority to generate a block, and transmit the determination result (or the confirmation result) to the first server 300-1 at operations S970-2.

It is assumed that the first server 300-1 has authority to generate a block. The first server 300-1 receives a plurality of confirmation results, and when it is identified that the first server 300-1 is authorized to generate a block based on the received confirmation result, the block generated in operation S960 may be determined at operations S975.

Meanwhile, here, operations S965-1, S970-1, S965-2, and S970-2 may be omitted according to the implementation example, and operation S975 may be directly performed in the first server 300-1 without a block generation confirmation request and confirmation result transmission.

Figure 10:
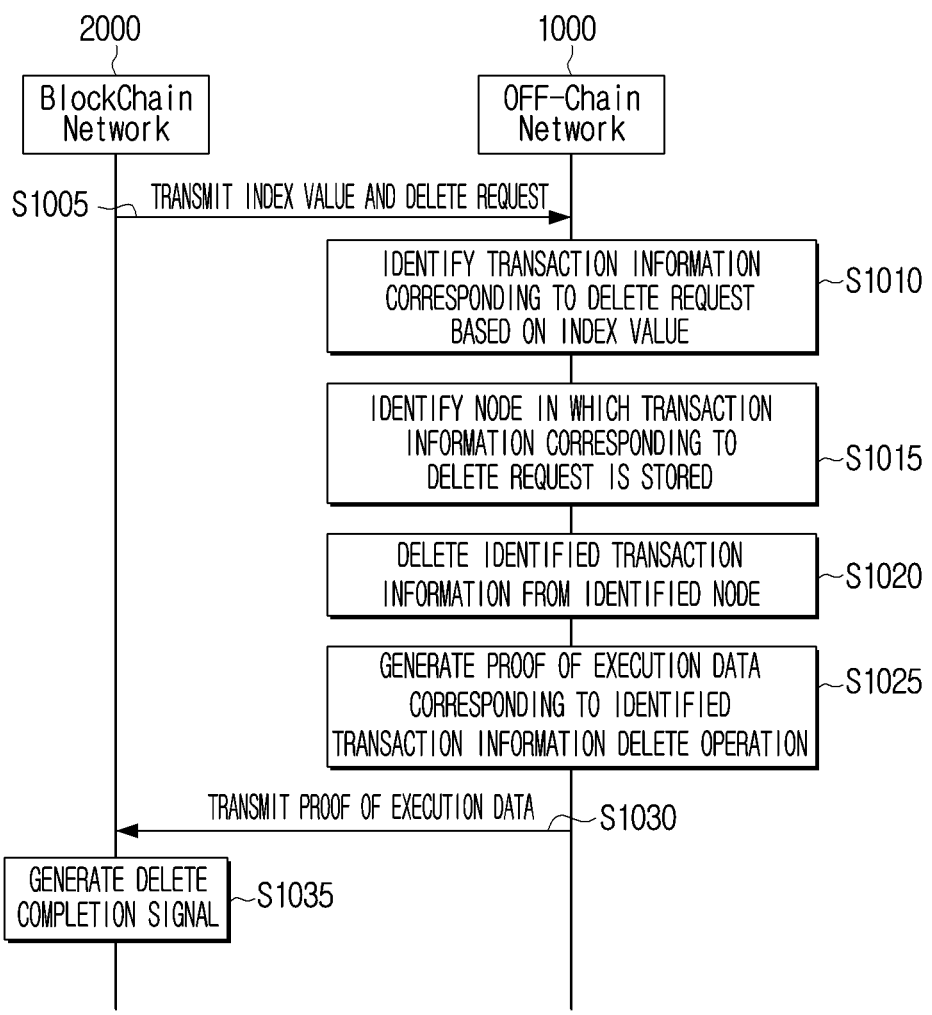
FIG. 10 is a flowchart illustrating an embodiment of deleting transaction information in an off-chain network according to an embodiment of the disclosure.

FIG. 10 is a flowchart illustrating an embodiment of deleting transaction information in an off-chain network according to an embodiment of the disclosure.

Referring to FIG. 10, the blockchain network 2000 may transmit an index value corresponding to a delete request and a delete request signal to the off-chain network 1000 at operation S1005. Here, the off-chain network 1000 may delete the transaction information corresponding to the received delete request based on the index value corresponding to the delete request at operation S1010. In addition, the off-chain network 1000 may identify a node in which the transaction information corresponding to the delete request is stored at operation S1015. As illustrated in FIG. 1B, the off-chain network 1000 may include a plurality of nodes, and the transaction information may be distributed and stored. Accordingly, the off-chain network 1000 needs to determine in which node of a plurality of nodes included in the off-chain network 1000 the transaction information to be deleted is stored.

After identifying at least one node in which the identified transaction information is stored, the off-chain network 1000 may delete the transaction information from the identified node at operation S1020. Here, the off-chain network 1000 may verify an operation of deleting the identified transaction information. Specifically, the off-chain network 1000 may generate verification data corresponding to the operation of deleting the identified transaction information at operation S1025. Then, the generated verification data may be transmitted to the blockchain network 2000 at operation S1030.

The blockchain network 2000 may determine whether the deletion of the transaction information is complete based on the received verification data. When it is determined that the deletion of the transaction information is complete, the blockchain network 2000 may generate the delete completion signal at operation S1035. Operations after the generation of the delete completion signal may correspond to S950 to S975 of FIG. 9. Therefore, a redundant description thereof will be omitted.

Figure 11:
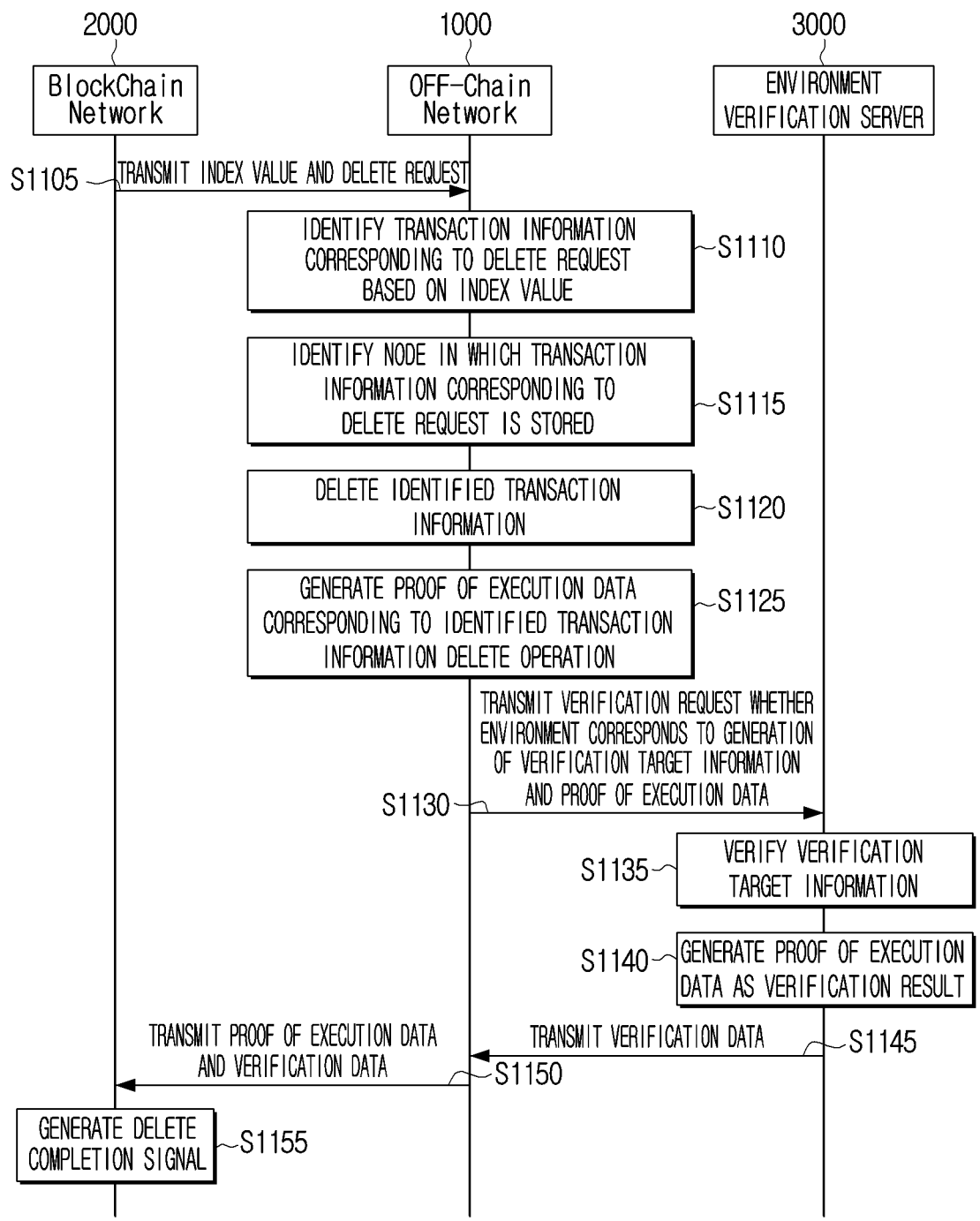
FIG. 11 is a flowchart illustrating of deleting transaction information in an off-chain network according to an embodiment of the disclosure.

FIG. 11 is a flowchart illustrating an embodiment of deleting transaction information in an off-chain network according to an embodiment of the disclosure.

Referring to FIG. 11, operations S1105, S1110, S1115, S1120, and S1125 may correspond to operations S1005, S1010, S1015, S1020, and S1025 of FIG. 10. Therefore, a redundant description thereof will be omitted.

The off-chain network 1000 may generate verification data in relation to an operation in which the identified transaction information is deleted. Here, the off-chain network 1000 may further prove that the verification data has not been forged or falsified. Specifically, the off-chain network 1000 may request validation from the environmental verification server 3000 whether it is an environment corresponding to the generation of validation target information and verification data at operation S1130.

Here, the validation target information may refer to at least one of hardware or software used to generate the verification data in the off-chain network 1000. For example, the hardware installed in the off-chain network 1000 may generate the verification data for operations performed in the off-chain network 1000. As another example, the software installed in the off-chain network 1000 may generate the verification data for operations performed in the off-chain network 1000. The verification data may include information verifying that specific operations are actually performed in the off-chain network 1000.

In generating the verification data in the off-chain network 1000, since the hardware and software are installed inside the off-chain network 1000, the possibility of forgery or falsification may not be ignored. Accordingly, the off-chain network 1000 may additionally receive verification data using an environmental verification server 3000 separately from generating the verification data itself.

Here, the environmental verification server 3000 may perform validation on validation target information (hardware or software information) at operation S1135. Specifically, the environmental verification server 3000 may obtain the information on the hardware and software to determine whether there has been forgery or falsification. For example, the off-chain network 1000 may transmit a serial number of hardware or software used to generate verification data to the environmental verification server 3000. In addition, the environmental verification server 3000 may determine whether the received serial number is a formally registered serial number.

The environmental verification server 3000 may generate verification data as a determination result and transmit the generated verification data to the off-chain network 1000 at operation S1140. Then, the generated verification data may be transmitted to the off-chain network 1000 at operation S1145.

The off-chain network 1000 may transmit the generated verification data and the received verification data to the blockchain network 2000 at operation S1150. The blockchain network 2000 may determine whether the deletion is complete based on the received verification data and verification data. When it is determined that the deletion is complete, the blockchain network 2000 may generate the delete completion signal at operation S1155.

Figure 12:
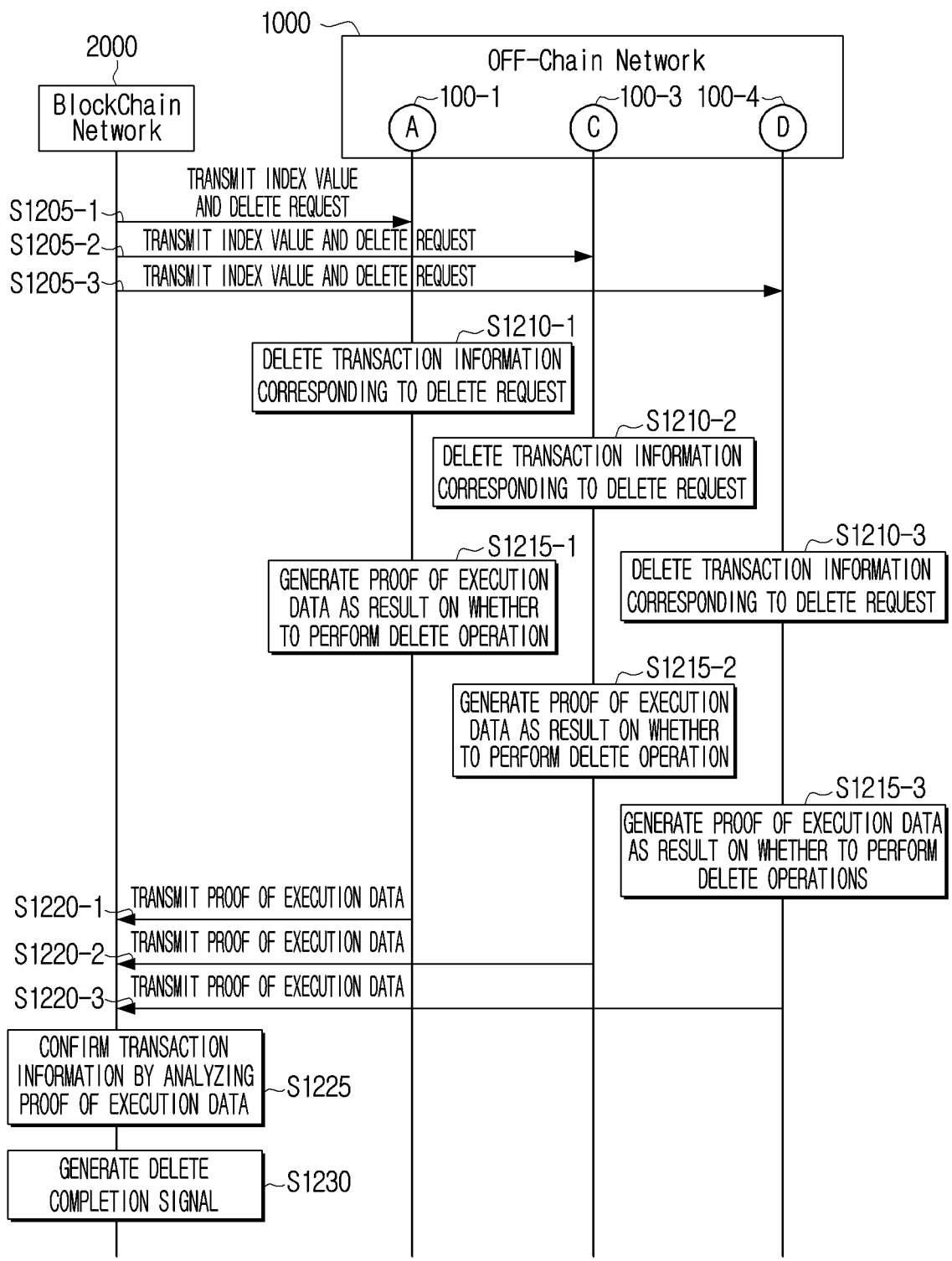
FIG. 12 is a flowchart illustrating an operation of generating verification data in an off-chain network according to an embodiment of the disclosure.

FIG. 12 is a flowchart illustrating an operation of generating verification data in an off-chain network according to an embodiment of the disclosure.

Referring to FIG. 12, the blockchain network 2000 may transmit the delete request to the off-chain network 1000. Here, the off-chain network 1000 may include a plurality of nodes (refer to FIG. 1B). In addition, the transaction information corresponding to the delete request may be stored only in a specific node among a plurality of nodes of the off-chain network 1000. For example, it is assumed that the transaction information of the first user is stored in the node A 100-1, the node C 100-3, and the node D 100-4 based on the smart contract (refer to FIG. 7).

The blockchain network 2000 may transmit a request to delete transaction information stored in the off-chain network 1000. Specifically, the blockchain network 2000 may identify in which node the transaction information that is the target of the delete request is stored based on the smart contract stored in the blockchain network 2000. The blockchain network 2000 may directly transmit the delete request to the identified node.

It is assumed that transaction information, which is the target of the delete request, is stored in the node A 100-1, the node C 100-3, and the node D 100-4. The blockchain network 2000 may transmit the index value corresponding to the delete request and the delete request signal to the node A 100-1, the node C 100-3, and the node D 100-4, respectively at operations S1205-1, S1205-2, and S1205-3.

Here, the off-chain network 1000 may delete the transaction information corresponding to the received delete request based on the index value corresponding to the delete request, and may generate the verification data that validates whether the delete operation is performed. In addition, the off-chain network 1000 may transmit the generated verification data to the blockchain network 2000.

Specifically, the node A 100-1, the node C 100-3, and the node D 100-4 may each delete the transaction information corresponding to the delete request based on the received delete request based on the index value corresponding to the delete request at operations S1210-1, S1210-2, and S1210-3. In addition, the node A 100-1, the node C 100-3, and the node D 100-4 may each generate the verification data as a result of whether the deletion operation is performed at operations S1215-1, S1215-2, and S1215-3. In addition, the node A 100-1, the node C 100-3, and the node D 100-4 may each transmit the generated verification data to the blockchain network 2000 at operations S1220-1, S1220-2, and S1220-3.

The blockchain network 2000 may receive at least one verification data from the off-chain network 1000 and analyze the received verification data. Then, the blockchain network 2000 may analyze the received verification data to confirm whether the transaction information has been deleted at operation S1225. When it is determined that the transaction information is deleted, the blockchain network 2000 may generate the delete completion signal at operation S1230. A process of analyzing the verification data will be described later with reference to FIG. 13.

Figure 13:
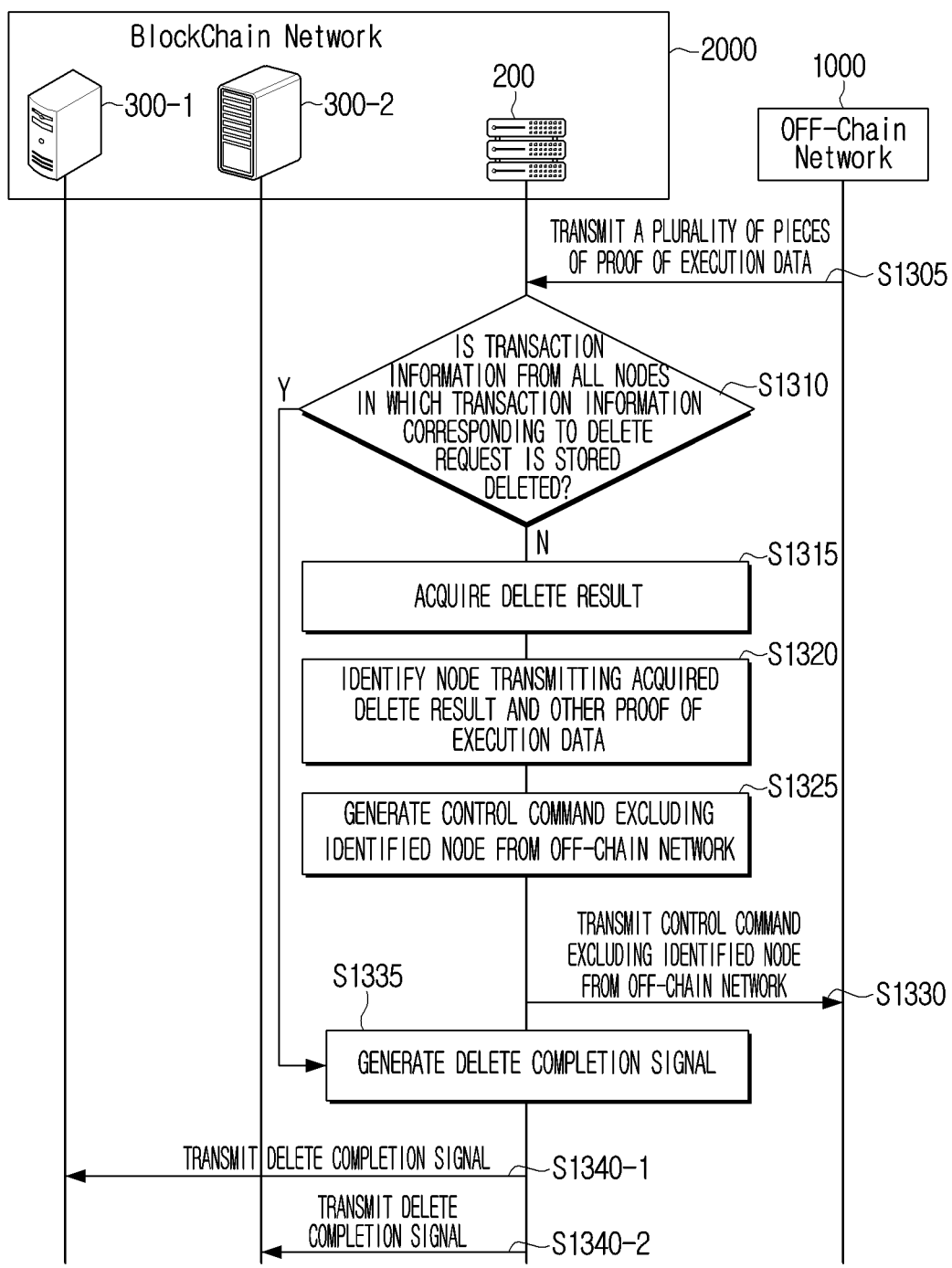
FIG. 13 is a flowchart illustrating an embodiment of analyzing verification data in a blockchain network according to an embodiment of the disclosure.

FIG. 13 is a flowchart illustrating an embodiment of analyzing verification data in a blockchain network according to an embodiment of the disclosure.

Referring to FIG. 13, the off-chain network 1000 may transmit a plurality of pieces of verification data to the blockchain network 2000 at operation S1305. It is assumed that the management server 200 among the plurality of servers included in the blockchain network 2000 receives a plurality of pieces of verification data.

The management server 200 may determine whether the transaction information is deleted from all nodes storing the transaction information corresponding to the delete request based on the plurality of pieces of received verification data at operation S1310. Here, all nodes storing the transaction information corresponding to the delete request may refer to nodes storing the target transaction information of the delete request, and all nodes storing the transaction information corresponding to the delete request may be identified through the smart contract. When it is determined that the transaction information has been deleted from all nodes, the management server 200 may generate the delete completion signal at operation S1335. When it is not determined that the transaction information has been deleted from all nodes, the management server 200 may obtain the deletion result through the verification data analysis at operation S1315. Here, the deletion result of operation S1315 may include the information on whether the deletion of the transaction information has been completed in a node having a threshold ratio or higher among the nodes in which the transaction information is stored.

For example, it is assumed that the off-chain network 1000 includes 6 nodes, and the transaction information is stored in 3 out of 6 nodes (node A 100-1, node C 100-3, and node D 100-4). In addition, it is assumed that a threshold ratio is 51%. Here, it is assumed that the verification data of the node A 100-1 is the delete completion, the verification data of the node C 100-3 is the delete completion, and the verification data of the node D 100-4 is the deletion failure. The management server 200 may analyze three pieces of verification data to determine that the delete completion is 66% and the deletion failure is 33%. It may be determined that the delete completion having a value greater than or equal to the threshold ratio (51%) is the deletion result. For example, the blockchain network 2000 may obtain the delete completion. On the other hand, the off-chain network 1000 may appropriately predefine the total number of nodes and the number of storage nodes so that the threshold ratio does not come out with the same ratio (50%, 50%).

The management server 200 may identify verification data including information different from the obtained deletion result, and may identify a node that has transmitted the identified verification data.

In the above example, since the deletion result is the delete completion, the verification data including information (deletion failure) different from the deletion result may be transmitted from the node D 100-4. Accordingly, the node identified in operation S1320 may be the node D 100-4.

The management server 200 may generate a control command for excluding the identified node from the off-chain network 1000 at operation S1325. Then, the management server 200 may transmit the generated control command to the off-chain network 1000 at operation S1330. The management server 200 may generate the delete completion signal after transmitting the generated control command to the off-chain network 1000 at operation S1335. Here, the delete completion signal may include a control signal for changing the state of the smart contract stored in at least one of a plurality of servers included in the blockchain network 2000. In addition, here, it may mean a control signal for generating a block including information on the delete completion operation.

Here, in operation S1330, it was described as a control command to exclude the node identified in operation S1320 from the off-chain network. However, depending on the implementation, in addition to the control command for excluding the node identified in operation S1320 from the off-chain network, a control command for imposing various penalties may be included. Here, the penalty may be changing (or decreasing) a deposit provided when participating in the off-chain network 1000 or losing a data sharing authority later.

The management server 200 may transmit the delete completion signal to the plurality of servers included in the blockchain network 2000 after generating the delete completion signal at operation S1340-1 and at operation S1340-2.

On the other hand, although it has been described in FIG. 13 as an operation for excluding the identified node from the off-chain network 1000, it may be implemented in a form of treating as a black node (or a black list) without storing new block and transaction information according to an embodiment of the disclosure, or it may be implemented in the form of imposing a penalty on the identified node.

On the other hand, although it has been described in FIG. 13 that the operation of analyzing the verification data is performed in the blockchain network 2000, it may be implemented in the form of analyzing the verification data in the off-chain network 1000 according to an embodiment.

Figure 14:
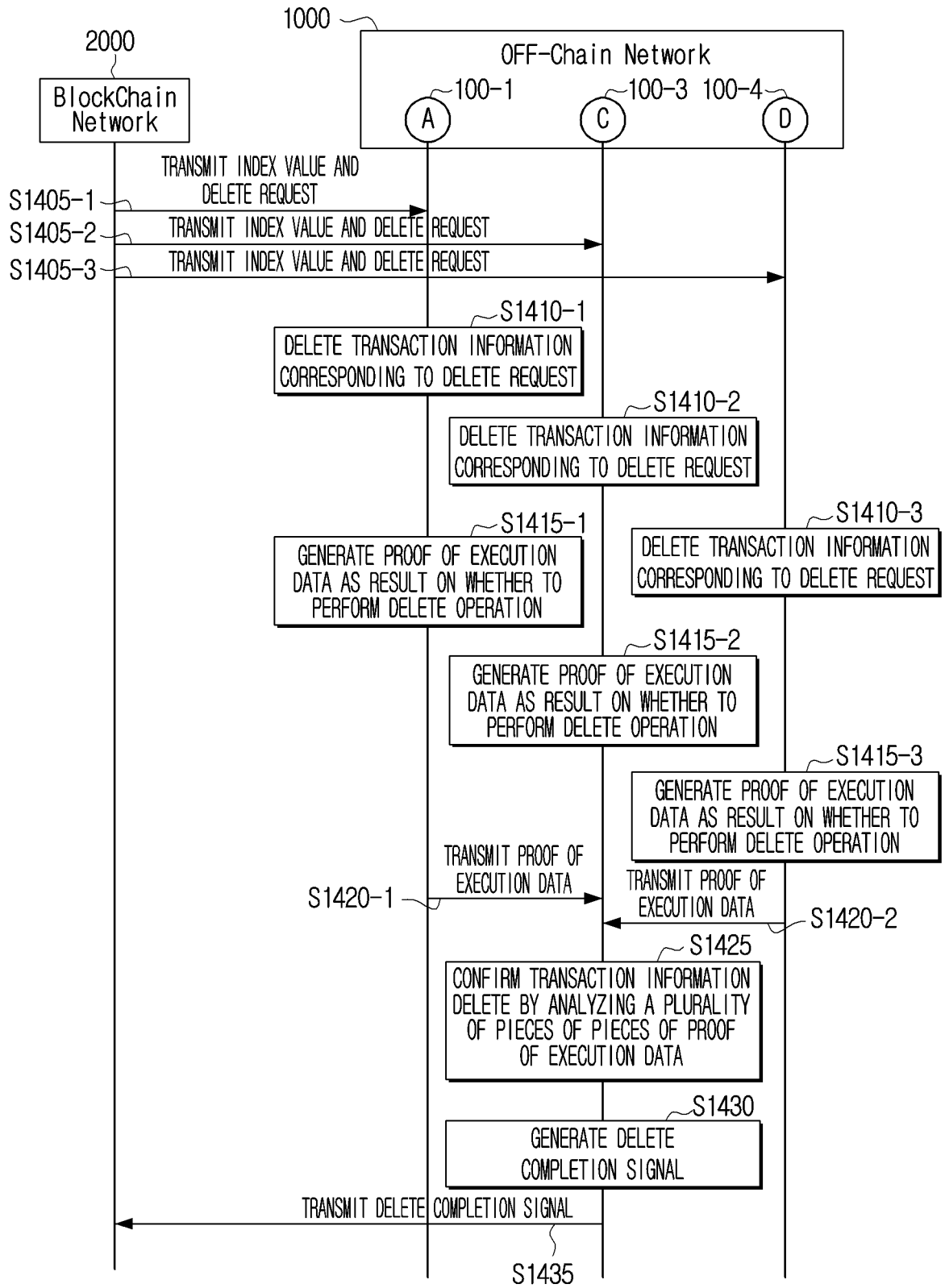
FIG. 14 is a flowchart illustrating an embodiment of analyzing verification data in an off-chain network according to an embodiment of the disclosure.

FIG. 14 is a flowchart illustrating an embodiment of analyzing verification data in an off-chain network according to an embodiment of the disclosure.

Referring to FIG. 14, the blockchain network 2000 may transmit an index value corresponding to a delete request and a delete request signal to the off-chain network 1000. It is assumed that the blockchain network 2000 has received the delete request, and a deletion target (or transaction information) corresponding to the received delete request is stored in the node A 100-1, the node C 100-3, and the node D 100-4.

The blockchain network 2000 may transmit the index value corresponding to the delete request and the delete request signal to the node A 100-1, the node C 100-3, and the node D 100-4, respectively at operations S1405-1, S1405-2, and S1405-3. The node A 100-1, the node C 100-3, and the node D 100-4 may each delete the transaction information corresponding to the delete request based on the index value corresponding to the delete request at operations S1210-1, S1210-2, and S1210-3. The node A 100-1, the node C 100-3, and the node D 100-4 may each generate the verification data as a result of the deletion operation in order to verify whether the deletion operation is performed at operations S1415-1, S1415-2, and S1415-3.

In addition, the node A 100-1, the node C 100-3, and the node D 100-4 may transmit the generated verification data to at least one of a plurality of nodes included in the off-chain network 1000. As an example, the node A 100-1, the node C 100-3, and the node D 100-4 may be implemented in the form of transmitting verification data to a predefined node (host node). As another example, the node A 100-1, the node C 100-3, and the node D 100-4 may be implemented in the form of transmitting verification data to all nodes of the off-chain network 1000. As another example, the node A 100-1, the node C 100-3, and the node D 100-4 may be implemented in the form of transmitting verification data only to the node A 100-1, the node C 100-3, and the node D 100-4.

FIG. 14 illustrates an embodiment of transmitting verification data to a predefined node. Here, it is assumed that the predefined node is the node C 100-3. The node A 100-1 may transmit the verification data generated by the node A 100-1 to the node C 100-3 at operation S1420-1. In addition, the node D 100-4 may transmit the verification data generated by the node D 100-4 to the node C 100-3 at operation S1420-2.

Here, the node C 100-3 may analyze the plurality of pieces of received verification data to determine whether the transaction information has been deleted at operation S1425. Specific operations for operation S1425 may include operations S1310, S1315, S1320, S1325, and S1330 of FIG. 13. Accordingly, the contents already described in FIG. 13 will be omitted.

When the node C 100-3 determines that the transaction information has been deleted as a result of operation S1425, the node C 100-3 may generate the delete completion signal at operation S1430. In addition, the node C 100-3 may transmit the generated delete completion signal to the blockchain network 2000 at operation S1435.

Meanwhile, in FIGS. 12 and 14, it is described in which node the target of the delete request is stored in the blockchain network 2000 based on the smart contract, and the delete request is transmitted only to a specific node. However, if this is only an embodiment of the disclosure, the delete request may be transmitted to all nodes included in the off-chain network 1000 in actual implementation, and the embodiment will be described later with reference to FIG. 15.

Figure 15:
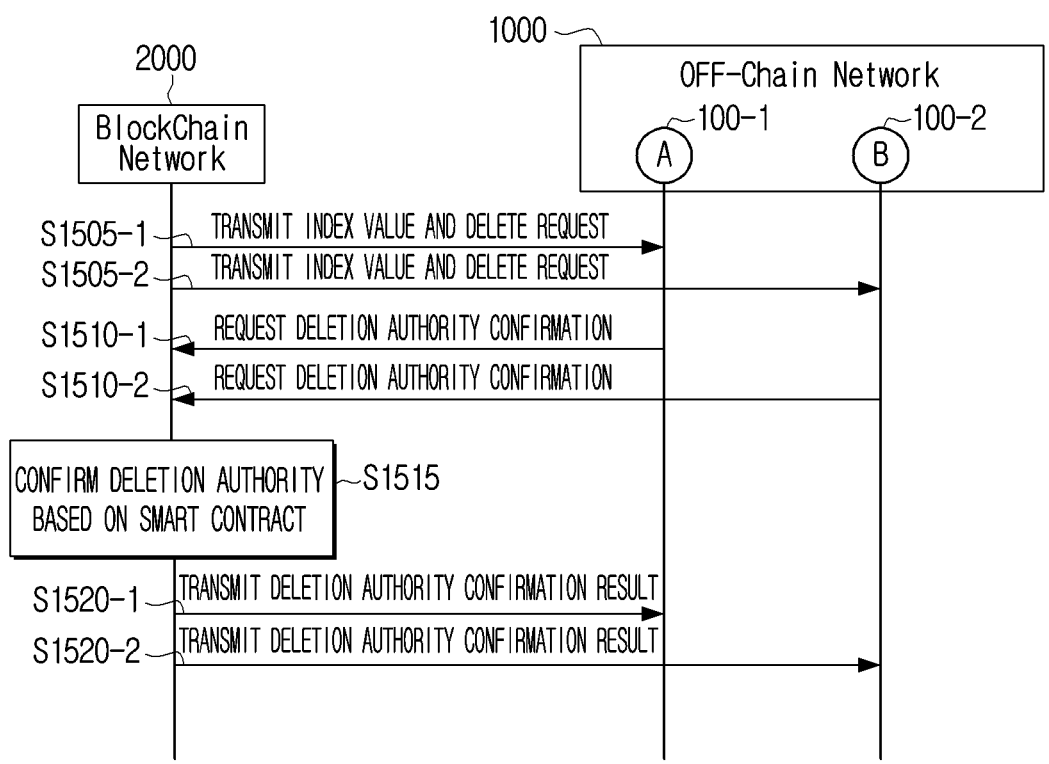
FIG. 15 is a flowchart illustrating an operation of confirming deletion authority in a node included in an off-chain network according to an embodiment of the disclosure.

FIG. 15 is a flowchart illustrating an operation of confirming deletion authority in a node included in an off-chain network according an embodiment of the disclosure.

Referring to FIG. 15, it is assumed that the off-chain network 1000 includes the node A 100-1 and the node B 100-2. It is assumed that the blockchain network 2000 has received a delete request of transaction information from a user. When receiving the delete request, the blockchain network 2000 may transmit the index value corresponding to the delete request and the delete request signal to all nodes included in the off-chain network 1000 at operations S1505-1 and S1505-2. Since the blockchain network 2000 has transmitted the delete request to all nodes included in the off-chain network 1000, the blockchain network 2000 needs to determine whether the transaction information to be deleted is stored in the node A 100-1 and the node B 100-2, and determine whether the node A 100-1 and the node B 100-2 have authority to delete the transaction information to be deleted.

According to an embodiment of the disclosure, the node A 100-1 and the node B 100-2 that have received the delete request may request the blockchain network 2000 to confirm each deletion authority at operations S1510-1 and S1510-2. Here, the deletion authority may be a concept including whether the transaction information to be deleted is included.

The blockchain network 2000 may confirm the deletion authority based on the smart contract and the index value corresponding to the delete request at operation S1515. Then, the blockchain network 2000 may transmit the result of the operation confirming the deletion authority to all nodes included in the off-chain network 1000, respectively at operations S1520-1 and S1520-2. Here, the result of the operation of confirming the deletion authority may be one of "authority to store and delete transaction information", "no authority to store and delete transaction information," and "no authority to not store and to delete transaction information."

For example, it is assumed that the result for the node A 100-1 is "authority to store and delete transaction information" and the result for the node B 100-2 is "no authority to not store and delete transaction information." The node A 100-1 that has received the confirmation result of the deletion authority may delete the transaction information stored in the node A 100-1. Meanwhile, the node B 100-2 receiving the confirmation result of the deletion authority does not store the transaction information corresponding to the delete request, and thus may not perform a separate operation.

Meanwhile, according to another embodiment of the disclosure, each node may determine whether the transaction information to be deleted is stored in the node A 100-1 and the node B 100-2. When there is no transaction information in one's own node, it may not separately request confirmation of the deletion authority from the blockchain network 2000. When there is the transaction information in one's own node, it may request the confirmation of the deletion authority from the blockchain network 2000.

Figure 16:
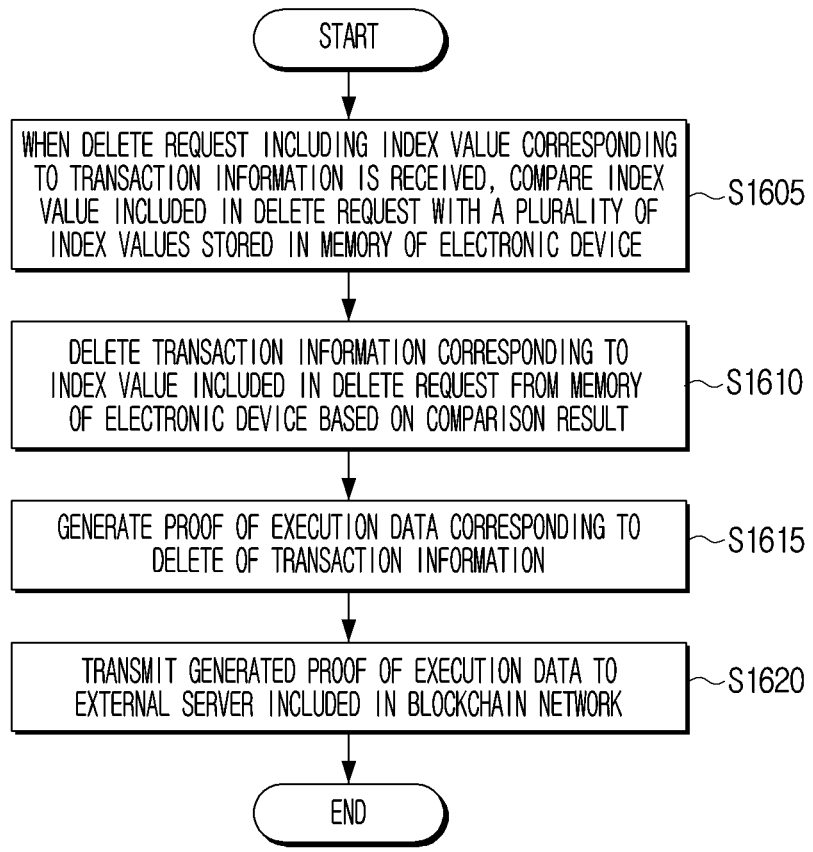
FIG. 16 is a diagram illustrating a control method of an electronic device according to an embodiment of the disclosure.

FIG. 16 is a diagram illustrating a control method of an electronic device according to an embodiment of the disclosure.

Referring to FIG. 16, a control method of the electronic device 100 for storing a plurality of pieces of transaction information and a plurality of index values corresponding to a plurality of pieces of transaction information according to an embodiment of the disclosure may compare an index value included in a delete request with a plurality of index values stored in the memory 110 of the electronic device 100 when a delete request including an index value corresponding to transaction information is received at operation S1605.

Then, the electronic device 100 may delete the transaction information corresponding to the index value included in the delete request from the memory 110 of the electronic device 100 based on the comparison result at operation S1610.

The electronic device 100 may generate verification data corresponding to the deletion of the transaction information at operation S1615.

The electronic device 100 may transmit the generated verification data to an external server included in the blockchain network at operation S1620.

Here, the verification data may include information indicating whether the delete operation is performed on the transaction information corresponding to the index value included in the delete request in the memory 110 of the electronic device 100.

Here, the verification data may include at least one of contents of the delete request, the index value included in the delete request, identification information of the electronic device 100 that generates the verification data, delete result information, and time information at which the delete operation is performed.

Meanwhile, the control method of the electronic device 100 may further include requesting the validation of the hardware environment of the electronic device 100 or the software environment of the electronic device 100 from the environmental verification server, and transmitting the verification data to the external server when the verification data is received from the environmental verification server.

Meanwhile, the control method of the electronic device 100 may further include requesting the deletion authority information from the external server when the delete request is received, and deleting the transaction information corresponding to the received delete request when the deletion authority information is received from the external server.

Here, the deletion authority information may be obtained based on a smart contract stored in the external server, and the smart contract may include at least one of the storage authority information of the electronic device 100 and the deletion authority information of the electronic device 100.

Meanwhile, the verification data may be proof of execution (POE) data corresponding to the deletion of the transaction information.

Meanwhile, the control method of the electronic device illustrated in FIG. 16 may be executed on the electronic device having the configuration of FIG. 3A and may also be executed on the electronic device having other configurations.

Figure 17:
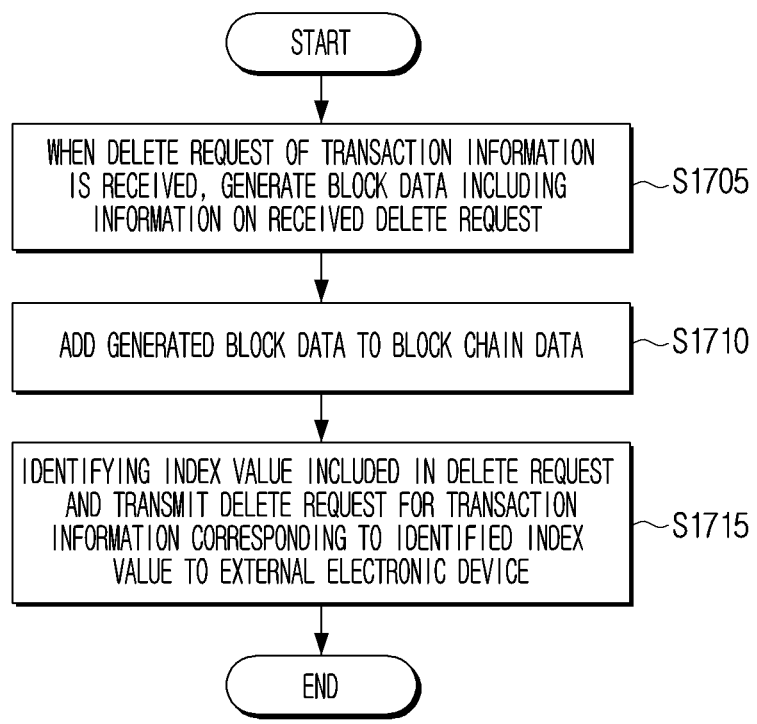
FIG. 17 is a flowchart illustrating a control method of a management server according to an embodiment of the disclosure.

FIG. 17 is a flowchart illustrating a control method of a management server according to an embodiment of the disclosure.

Referring to FIG. 17, in the control method of the server 200 storing the block data including the index value corresponding to the transaction information and the blockchain data including the block data according to an embodiment of the disclosure, when the delete request of the transaction information is received, the block data including the information on the received delete request may be generated at operation S1705.

Then, the server 200 may add the generated block data to the blockchain data at operation S1710.

In addition, the electronic device 100 may identify the index value included in the delete request and transmit the delete request for the transaction information corresponding to the identified index value to the external electronic device at operation S1715.

The control method of the server 200 may further include obtaining the result information of the delete request based on the verification data when the verification data corresponding to the delete request is received from the external electronic device, generating the block data including the result information of the delete request, and adding the block data including the result information of the generated delete request to the blockchain data.

Here, in the obtaining of the result information of the delete request, when verification data is received from a plurality of external electronic devices, respectively, the processor may compare the plurality pieces of received verification data and obtain result information of the delete request based on the comparison result.

Here, the control method of the server 200 may further include identifying verification data including information different from the result information of the delete request among the plurality of received verification data, and determining whether the identified verification data is forged.

Here, the control method may further include identifying the external electronic device that transmits the forged verification data, and changing the storage authority information of the identified external electronic device.

Meanwhile, the server 200 may store smart contract information, and the smart contract may include at least one of storage authority information of the external electronic device and deletion authority information of the external electronic device.

Meanwhile, the control method of the server 200 may further include obtaining the identification information of the user terminal device that transmits the delete request, and determining whether the user terminal device has authority to delete the transaction information corresponding to the index value included in the delete request based on the obtained identification information of the user terminal device.

Meanwhile, the verification data may include information indicating whether the delete operation is performed on the transaction information corresponding to the index value included in the delete request in the external electronic device.

Here, the verification data may include at least one of contents of the delete request, the index value included in the delete request, identification information of the electronic device that generates the verification data, delete result information, and time information at which the delete operation is performed.

Meanwhile, the control method of the electronic device illustrated in FIG. 17 may be executed on the electronic device having the configuration of FIG. 3B and may also be executed on the electronic device having other configurations.

Meanwhile, the methods according to various embodiments of the disclosure described above may be implemented in a form of application that may be installed in the existing electronic device.

In addition, the methods according to various embodiments of the disclosure described above may be implemented only by software upgrade or hardware upgrade of the existing electronic device.

Further, various embodiments of the disclosure described above may also be performed through an embedded server included in the electronic device or an external server of at least one of the electronic device or the display device.

Meanwhile, according to an embodiment of the disclosure, the various embodiments described above may be implemented by software including instructions stored in a machine-readable storage medium (for example, a computer-readable storage medium). A machine is a device capable of calling a stored instruction from a storage medium and operating according to the called instruction, and may include the electronic device of the disclosed embodiments. In the case in which a command is executed by the processor, the processor may directly perform a function corresponding to the command or other components may perform the function corresponding to the command under a control of the processor. The command may include codes created or executed by a compiler or an interpreter. The machine-readable storage medium may be provided in a form of a non-transitory storage medium. Here, the term 'non-transitory' means that the storage medium is tangible without including a signal, and does not distinguish whether data are semi-permanently or temporarily stored in the storage medium.

In addition, according to an embodiment of the disclosure, the methods according to the diverse embodiments described above may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In case of the online distribution, at least a portion of the computer program product may be at least temporarily stored in a storage medium, such as a memory of a server of a manufacturer, a server of an application store, or a relay server or be temporarily generated.

In addition, each of components (for example, modules or programs) according to the diverse embodiments described above may include a single entity or a plurality of entities, and some of the corresponding sub-components described above may be omitted or other sub-components may be further included in the diverse embodiments. Alternatively or additionally, some constituent elements (for example, a module or a program) may be integrated into a single entity to perform the same or similar functions performed by each corresponding constituent element prior to the integration. Operations performed by the modules, the programs, or the other components according to the diverse embodiments may be executed in a sequential manner, a parallel manner, an iterative manner, or a heuristic manner, at least some of the operations may be performed in a different order or be omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a communication interface;
a memory configured to store at least one instruction and store a plurality of pieces of transaction information and a plurality of index values corresponding to the plurality of pieces of transaction information; and
at least one processor configured to be connected to the memory to control the electronic device,
wherein the at least one processor is configured to execute the at least one instruction to:
compare an index value included in a delete request with the plurality of index values stored in the memory when the delete request including the index value corresponding to the transaction information is received,
delete the transaction information corresponding to the index value included in the delete request from the memory based on the comparison result,
generate verification data corresponding to the deletion of the transaction information, and
control the communication interface to transmit the generated verification data to an external server included in a blockchain network.

2. The electronic device of claim 1, wherein the verification data includes information indicating whether a delete operation is performed on the transaction information corresponding to the index value included in the delete request in the memory.

3. The electronic device of claim 2, wherein the verification data includes at least one of contents of the delete request, the index value included in the delete request, identification information of the electronic device that generates the verification data, delete result information, and time information at which the delete operation is performed.

4. The electronic device of claim 1,
wherein the at least one processor is further configured to request an environment verification server to validate a hardware environment of the electronic device or a software environment of the electronic device for generating the verification data, and
wherein the at least one processor is further configured to control the communication interface to transmit verification data to the external server when verification data is received from the environment verification server.

5. The electronic device of claim 1,
wherein the at least one processor is further configured to request deletion authority information from the external server when the delete request is received, and
wherein the at least one processor is further configured to delete transaction information corresponding to the received delete request when the deletion authority information is received from the external server.

6. The electronic device of claim 5,
wherein the deletion authority information is obtained based on a smart contract stored in the external server, and
wherein the smart contract includes at least one of storage authority information of the electronic device and deletion authority information of the electronic device.

7. The electronic device of claim 1, wherein the verification data is proof of execution (POE) data corresponding to the deletion of the transaction information.

8. A server comprising:
a communication interface;
a memory configured to store block data including an index value corresponding to transaction information and blockchain data including the block data; and
at least one processor connected to the memory to control the server,
wherein the at least one processor is configured to:
generate, when a delete request of transaction information is received, block data including information on the received delete request and adds the generated block data to the blockchain data,
identify an index value included in the delete request, and
control the communication interface to transmit a delete request for transaction information corresponding to the identified index value to an external electronic device.

9. The server of claim 8, wherein the at least one processor is further configured to:
obtain result information of the delete request based on verification data when the verification data corresponding to the delete request is received from an external electronic device,
generate block data including result information of the delete request, and
add block data including result information of the generated delete request to the blockchain data.

10. The server of claim 9, wherein, when verification data is received from a plurality of external electronic devices, respectively, the at least one processor is further configured to compare a plurality of pieces of received verification data and obtains result information of the delete request based on a comparison result.

11. The server of claim 10, wherein the at least one processor is further configured to:
- identify verification data including information different from the result information of the delete request among a plurality of received verification data, and
- determine the identified verification data is forged.

12. The server of claim 11, wherein the at least one processor is further configured to:
- identify an external electronic device that transmits the forged verification data, and
- change storage authority information of the identified external electronic device.

13. The server of claim 8,
- wherein the memory is further configured to store smart contract information, and
- wherein the smart contract includes at least one of storage authority information of the external electronic device and deletion authority information of the external electronic device.

14. The server of claim 8, wherein the at least one processor is further configured to:
- obtain identification information of a user terminal device that transmits the delete request, and
- determine whether the user terminal device has authority to delete transaction information corresponding to the index value included in the delete request based on the obtained identification information of the user terminal device.

15. A method of controlling an electronic device for storing a plurality of pieces of transaction information and a plurality of index values corresponding to the plurality of pieces of transaction information, the method comprising:
- comparing an index value included in a delete request with the plurality of index values stored in a memory when the delete request including the index value corresponding to the transaction information is received;
- deleting the transaction information corresponding to the index value included in the delete request from the memory based on the comparison result;
- generating verification data corresponding to the deletion of the transaction information; and
- transmitting the generated verification data to an external server included in a blockchain network.

* * * * *